US009009432B2

(12) United States Patent
Sato et al.

(10) Patent No.: US 9,009,432 B2
(45) Date of Patent: Apr. 14, 2015

(54) STORAGE SYSTEM EFFECTIVELY MANAGING A CAPACITY FOR REMOTE COPY

(71) Applicant: Hitachi, Ltd., Tokyo (JP)

(72) Inventors: Takamasa Sato, Odawara (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/108,503

(22) Filed: Dec. 17, 2013

(65) Prior Publication Data

US 2014/0108749 A1    Apr. 17, 2014

Related U.S. Application Data

(63) Continuation of application No. 13/143,565, filed as application No. PCT/JP2011/003420 on Jun. 15, 2011, now Pat. No. 8,627,034.

(51) Int. Cl.
*G06F 12/00* (2006.01)
*G06F 3/06* (2006.01)
*G06F 11/20* (2006.01)

(52) U.S. Cl.
CPC .......... *G06F 3/0644* (2013.01); *G06F 11/2066* (2013.01); *G06F 11/2071* (2013.01); *G06F 3/0619* (2013.01); *G06F 3/067* (2013.01); *G06F 2201/815* (2013.01); *G06F 2201/855* (2013.01)

(58) Field of Classification Search
CPC ...................... G06F 2212/152; G06F 2212/313
USPC .................................................. 711/162, 163
See application file for complete search history.

(56) References Cited

U.S. PATENT DOCUMENTS

| 2005/0015657 | A1 | 1/2005 | Sugiura et al. |
| 2006/0174076 | A1 | 8/2006 | Takeda et al. |
| 2008/0101605 | A1 | 5/2008 | Kitamura et al. |
| 2008/0201391 | A1 | 8/2008 | Arakawa et al. |
| 2008/0201527 | A1 | 8/2008 | Suzuki et al. |
| 2009/0094426 | A1 | 4/2009 | Ikeda et al. |
| 2009/0113153 | A1 | 4/2009 | Yamamoto et al. |
| 2009/0125680 | A1 | 5/2009 | Ninose et al. |
| 2010/0205390 | A1 | 8/2010 | Arakawa |
| 2010/0332780 | A1 | 12/2010 | Furuya |

FOREIGN PATENT DOCUMENTS

| EP | 1455265 | | 6/2003 |
| EP | 2219106 | | 8/2009 |
| JP | 2004-259079 | A | 9/2004 |
| JP | 2006-65629 | | 3/2006 |
| JP | 2008-198184 | A | 8/2008 |
| JP | 2009-093378 | A | 4/2009 |
| JP | 2009-123187 | A | 6/2009 |
| JP | 2011-013821 | A | 1/2011 |

OTHER PUBLICATIONS

Japanese Office Action received in Japanese Application No. 2013-528429 dated Jun. 10, 2014.

*Primary Examiner* — Gurtej Bansal
(74) *Attorney, Agent, or Firm* — Mattingly & Malur, P.C.

(57) ABSTRACT

In one of the storage control apparatuses in the remote copy system which performs asynchronous remote copy between the storage control apparatuses, virtual logical volumes complying with Thin Provisioning are adopted as journal volumes to which journals are written. The controller in the one of the storage control apparatuses assigns a smaller actual area based on the storage apparatus than in case of assignment to the entire area of the journal volume, and adds a journal to the assigned actual area. If a new journal cannot be added, the controller performs wraparound, that is, overwrites the oldest journal in the assigned actual area by the new journal.

19 Claims, 26 Drawing Sheets

Fig. 7A

| JNLG# | 0 | 1 | 2 | 3 | ............ | 100 | ............ |
|---|---|---|---|---|---|---|---|
| 1 | 1 | 1 | 1 | 0 |  | 0 |  |
| 2 | 1 | 1 | 0 | 0 |  | 0 |  |
| 3 | 1 | 0 | 0 | 0 |  | 0 |  |
| 4 | 0 | 0 | 0 | 0 |  | 0 |  |
| ⋮ | ⋮ | ⋮ | ⋮ | ⋮ |  | ⋮ |  |

Fig. 7B

| JNLG# | Usage rate (%) | Total number of pages | Number of pages in use |
|---|---|---|---|
| 1 | 25 | 100 | 25 |
| 2 | 50 | 100 | 50 |
| 3 | 60 | 100 | 60 |
| 4 | 70 | 100 | 70 |
|  |  |  |  |

Fig. 8A 341A

| VOL# | Usage condition | JNLG# | VOL attribute | Emulation type | Capacity (GB) |
|---|---|---|---|---|---|
| 1 | Unused | — | — | — | — |
| 2 | In use | — | Pool VOL | OPEN3 | 5 |
| 3 | In use | 0 | Data | OPEN6 | 4 |
| 4 | In use | 1 | JNL | OPEN3 | 3 |
| ..... | ..... | ..... | ..... | ..... | ..... |

Fig. 8B 341B

| VOL# | Usage condition | JNLG# | VOL attribute | Emulation type | Capacity (GB) |
|---|---|---|---|---|---|
| 101 | Unused | — | — | — | — |
| 102 | In use | — | Pool VOL | OPEN3 | 5 |
| 103 | In use | 0 | Data | OPEN6 | 4 |
| 104 | In use | 1 | JNL | OPEN3 | 3 |
| ..... | ..... | ..... | ..... | ..... | ..... |

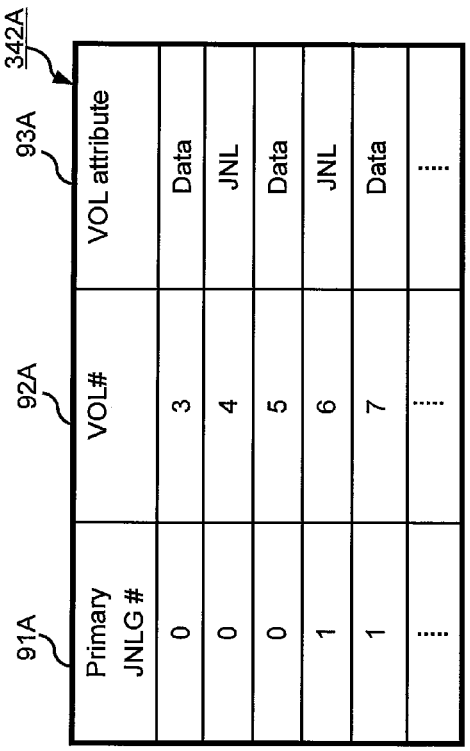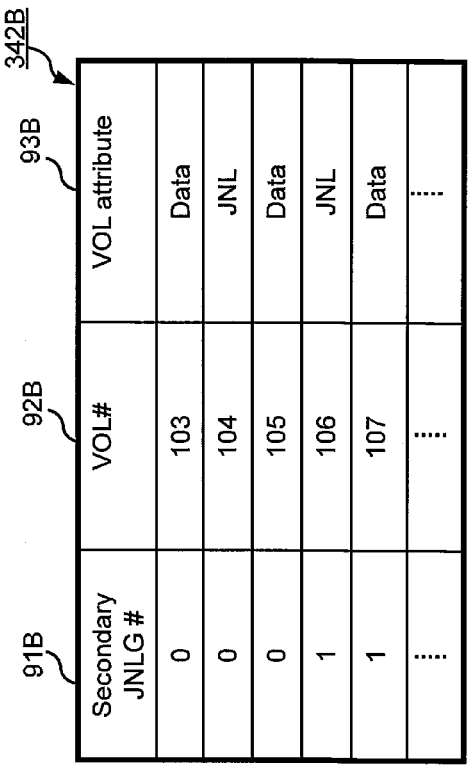

Fig. 10

| Primary JNLG # | Secondary JNLG # | Status |
|---|---|---|
| 0 | 0 | PAIR |
| 1 | 1 | COPY |
| 2 | 2 | COPY |
| 3 | 3 | COPY |
| 4 | 4 | SIMP |
| ..... | ..... | ..... |

343A

101 — Primary JNLG #
102 — Secondary JNLG #
103 — Status

| Primary VVOL # | Pool# | Capacity (GB) |
|---|---|---|
| 3 | 1 | 4 |
| 4 | 1 | 4 |
| 5 | 1 | 1 |
| 6 | 1 | 1 |
| ...... | ...... | ...... |

| Secondary VVOL # | Pool# | Capacity (GB) |
|---|---|---|
| 103 | 1 | 4 |
| 104 | 1 | 4 |
| 105 | 1 | 1 |
| 106 | 1 | 1 |
| ...... | ...... | ...... |

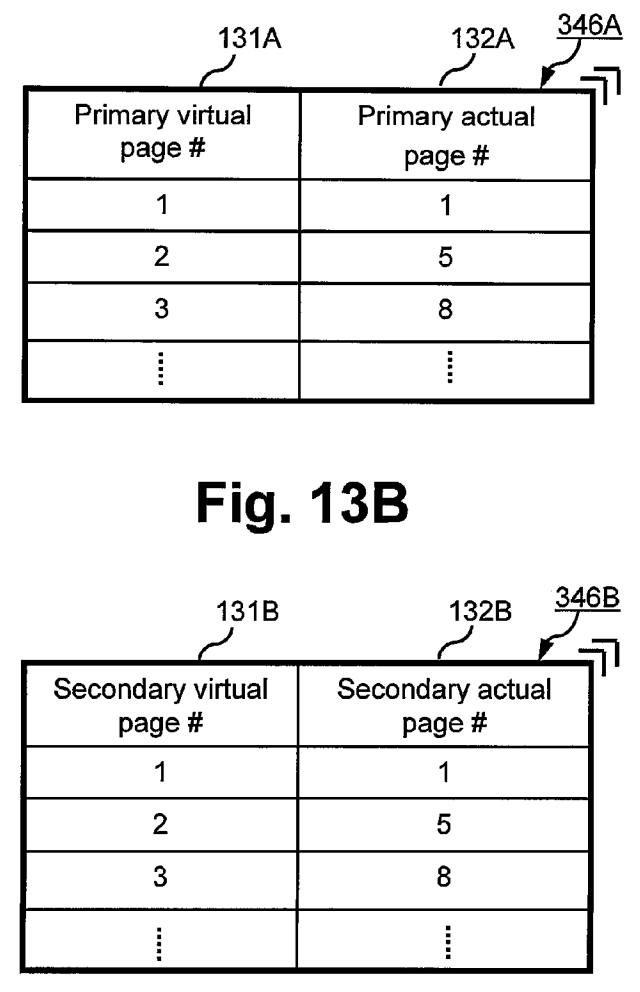

| Primary virtual page # 131A | Primary actual page # 132A 346A |
|---|---|
| 1 | 1 |
| 2 | 5 |
| 3 | 8 |
| ...... | ...... |

Fig. 13B

| Secondary virtual page # 131B | Secondary actual page # 132B 346B |
|---|---|
| 1 | 1 |
| 2 | 5 |
| 3 | 8 |
| ...... | ...... |

Fig. 14

| Primary virtual page # | Status | Page starting address | Page ending address | JNL starting address | JNL ending address | SEQ# |
|---|---|---|---|---|---|---|
| 1 | Copied | 0x0000001 | 0x0000040 | 0x0000001 | 0x0000020 | 1 |
| 1 | Copying | 0x0000041 | 0x0000080 | 0x0000041 | 0x0000050 | 2 |
| 2 | Readable | 0x0000081 | 0x0000120 | 0x0000041 | 0x0000080 | 3 |
| 2 | Not copied | 0x0000121 | 0x0000160 | — | — | — |
| 3 | Unassigned | — | — | — | — | — |
| 4 | ...... | | | | | ...... |

Fig. 15

| Secondary virtual page # | Status | Page starting address | Page ending address | JNL starting address | JNL ending address | SEQ# |
|---|---|---|---|---|---|---|
| 1 | Copied | 0x0000001 | 0x0000040 | 0x0000001 | 0x0000020 | 1 |
| 1 | Copying | 0x0000041 | 0x0000080 | 0x0000041 | 0x0000050 | 2 |
| 2 | Copying | 0x0000081 | 0x0000120 | 0x0000081 | 0x0000100 | 3 |
| 2 | Restorable | 0x0000121 | 0x0000160 | 0x0001101 | 0x0000120 | 4 |
| 3 | Not copied | 0x0000161 | 0x0000200 | — | — | — |
| 4 | Unassigned | — | — | — | — | — |
| ..... | ..... | ..... | ..... | ..... | ..... | ..... |

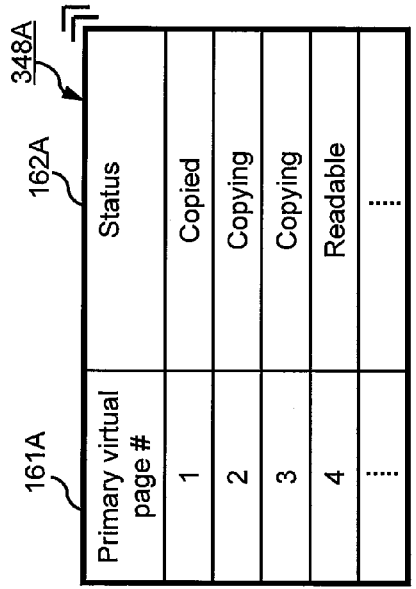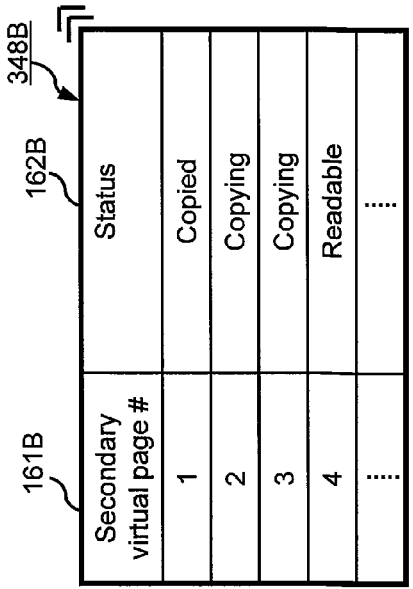

Fig. 17A 349A

| Primary Pool # | Actual page # | Virtual page # | Primary VVOL # |
|---|---|---|---|
| 1 | 1 | 1 | 3 |
| 1 | 2 | 2 | 3 |
| 1 | 3 | 3 | 3 |
| 1 | 4 | 1 | 4 |
| 1 | 5 | 2 | 4 |
| 1 | 6 | 3 | 4 |
| ..... | ..... | ..... | ..... |

| Secondary Pool # | Actual page # | Virtual page # | Secondary VVOL # |
|---|---|---|---|
| 1 | 1 | 1 | 103 |
| 1 | 2 | 2 | 103 |
| 1 | 3 | 3 | 103 |
| 1 | 4 | 1 | 104 |
| 1 | 5 | 2 | 104 |
| 1 | 6 | 3 | 104 |
| ..... | ..... | ..... | ..... |

171B 172B 173B 174B

STORAGE SYSTEM EFFECTIVELY MANAGING A CAPACITY FOR REMOTE COPY

This is a continuation of U.S. Ser. No. 13/143,565, filed Jul. 7, 2011, which is a 317 National Stage of PCT/JP2011/003420, filed Jun. 15, 2011. The entire disclosures of all of these applications are hereby incorporated by reference.

TECHNICAL FIELD

The present invention relates to asynchronous remote copy by utilizing journals.

BACKGROUND ART

Remote copy which is copying data between first and second storage apparatuses is known. As remote copy, for example, synchronous remote copy and asynchronous remote copy exist. If the first storage apparatus receives a write request from a host and if synchronous remote copy is adopted, a write completion response is transmitted to the host apparatus after data complying with the write request is transferred from the first storage apparatus to the second storage apparatus. Meanwhile, if asynchronous remote copy is adopted, the write completion response is transmitted to the host apparatus even if the data complying with the write request is not transferred from the first storage apparatus to the second storage apparatus.

In a remote copy system to which asynchronous remote copy is adopted (hereinafter referred to as an asynchronous remote copy system), for example, the first storage apparatus comprises a first JVOL (a logical volume in which a journal (hereinafter referred to as a JNL) is stored) as well as a first DVOL (a logical volume in which data is stored). Similarly, the second storage apparatus comprises a second JVOL as well as a second DVOL. If receiving a write request, the first storage apparatus stores data complying with the write request in the first DVOL and, at the same time, stores a JNL including the data in the first JVOL.

The first storage apparatus transfers the JNL in the first JVOL to the second storage apparatus, and the second storage apparatus writes the JNL from the first storage apparatus to the second JVOL. Subsequently, the second storage apparatus writes the data which the JNL in the second JVOL comprises to the second DVOL. By this method, the data written to the first DVOL is considered to have been copied to the second DVOL. As asynchronous remote copy, for example, the technology disclosed in the Patent Literature 1 is known.

CITATION LIST

Patent Literature

[PTL 1]
Japanese Patent Application Laid-Open (Kokai) No. 2006-65629

SUMMARY OF INVENTION

Technical Problem

A virtual logical volume (hereinafter referred to as a VVOL) complying with Thin Provisioning (also referred to as Dynamic Provisioning) is known. By Thin Provisioning, a VVOL comprising a plurality of virtual pages and a pool comprising a plurality of actual pages are comprised. If data is written to the VVOL, the actual pages are assigned to the virtual pages of the data write destination from the pool, and the data is written to the assigned actual pages.

The technology of adopting VVOLs as the first and the second DVOLs is known. However, the technology of adopting VVOLs as the first and the second JVOLs is unknown. If VVOLs are (a VVOL is) adopted as the first and/or the second JVOL (s), the following problems occur.

Generally, by asynchronous remote copy, a plurality of JNLs are added first to the head area of the JVOL. Subsequently, if a new JNL is written after the JNLs are written to the last area of the JVOL (after the JNLs are written to all the areas in the JVOL), the oldest JNL in the JVOL is overwritten by the new JNL (wraparound). However, if the JNLs are written to the last area of the JVOL, the actual pages are considered to have been assigned to all the virtual pages in the JVOL.

The capacity of a JVOL is generally larger than [the capacity of] a DVOL, and is determined, for example, based on one or a plurality of perspectives (whose concrete examples are a write frequency which is the frequency of receiving write requests specifying the JVOL (the unit is TOPS (Input output Per Second) for example) and a length of time in which [the system] can resist the disconnection of the remote line). Therefore, if the actual pages are assigned to all the areas in the JVOL, the number of actual pages to be used is likely to be considerable. For this reason, a large number of actual pages are required. Furthermore, if the actual pages in the pool are assigned to the DVOL as well as to the JVOL, the number of actual pages to be assigned to the DVOL might not be enough, and an even larger number of actual pages become necessary for solving this problem.

Therefore, the purpose of the present invention is to be able to inhibit the amount of actual pages to be used even if a VVOL is adopted as a JVOL.

Solution to Problem

A VVOL (a virtual logical volume complying with Thin Provisioning) is adopted as a JVOL. The VVOL is configured of a plurality of virtual areas and, at the same time, the size of a JNL is smaller than the size of a virtual area. A first storage control apparatus (either one storage control apparatus of the storage control apparatuses as the copy source and the copy destination) is supposed to add JNLs to the JVOL. If writing a JNL to the JVOL, the first storage control apparatus writes the JNL to an actual area assigned from the pool configured of a plurality of actual areas to the virtual area. The number of actual areas to be assigned to the JVOL is N. N is an integer which is 1 or larger and, at the same time, smaller than the number of actual areas to be assigned to all the areas in the JVOL (typically the number of virtual areas configuring the JVOL). If unable to newly add journals to N units of actual areas assigned to the JVOL, the first storage control apparatus performs wraparound (overwriting the old journals in the N units of already assigned actual areas with the write target journals). The JVOL may be either of a primary JVOL and a secondary JVOL which are explained later.

Although the number of actual areas to be assigned to the JVOL is N, actual areas may also be assigned to all of the N in advance, and actual areas may also be dynamically assigned to all of the N. Furthermore, it may also be permitted to assign the actual areas to a part of the N in advance and dynamically assign the actual areas to the other parts.

BRIEF DESCRIPTION OF DRAWINGS

FIG. 1 shows the overview of the processing of an asynchronous type remote copy system including the storage control apparatus related to an embodiment of the present invention.

FIG. 2 shows a configuration example of a primary storage apparatus 20A.

[FIG. 3]

FIG. 4 shows the relationship between the capacity of the slot of a CM 35A and the actual pages assigned to a primary JVOL 22A.

FIG. 5 shows the relationship between the capacity of each of the pages and the capacity of each of the JNLs.

FIG. 6 shows the overview of the processing of a controller 30A.

[FIG. 7]

FIG. 7A shows a configuration example of a primary virtual page bitmap 70A. FIG. 7B shows a configuration example of a JNLG usage condition management table 700A.

[FIG. 8]

FIG. 8A shows a configuration example of a primary VOL management table 341A. FIG. 8B shows a configuration example of a secondary VOL management table 341B.

[FIG. 9]

FIG. 9A shows a configuration example of a primary JNLG management table 342A. [FIG. 9B] shows a configuration example of a secondary JNLG management table 342B.

[FIG. 10]

FIG. 10 shows a configuration example of JNLG pair management tables 343A, 343B.

FIG. 11 shows a configuration example of VOL pair management tables 344A, 344B.

[FIG. 12]

FIG. 12A shows a configuration example of a primary VVOL management table 345A. FIG. 12B shows a configuration example of a secondary VOL management table 345B.

[FIG. 13]

FIG. 13A shows a configuration example of a primary virtual page assignment management table 346A. FIG. 13B shows a configuration example of a secondary virtual page assignment management table 346B.

[FIG. 14]

FIG. 14 shows a configuration example of a primary JNL status management table 347A.

[FIG. 15]

FIG. 15 shows a configuration example of a secondary JNL status management table 347B.

[FIG. 16]

FIG. 16A shows a configuration example of a primary virtual page status management table 348A. FIG. 16B shows a configuration example of a secondary virtual page status management table 348B.

[FIG. 17]

FIG. 17A shows a configuration example of a primary pool management table 349A. FIG. 17B shows a configuration example of a secondary pool management table 349B.

FIG. 18 shows an example of the flow of the processing for creating a pair of JNLGs.

FIG. 19 shows an example of the flow of the processing for copying a JNL from a primary JVOL 22A to a secondary JVOL 22B.

FIG. 20 shows an example of the flow of the processing for restoring data to a secondary DVOL 21B.

FIG. 21 shows an example of the flow of the processing for performing automatic definition of a JNLG.

FIG. 22 shows an example of the details of S243 in FIG. 21.

FIG. 23 shows an example of the details of S246 in FIG. 21.

FIG. 24 shows an example of the flow of the processing incase where the usage rate of the JVOL exceeds a threshold.

FIG. 25 shows an example of the flow of the processing for writing JNLs to the primary JVOL 22A.

FIG. 26 shows an example of the flow of the processing related to switching the unit of transferring JNLs.

DESCRIPTION OF EMBODIMENTS

Figure 1:
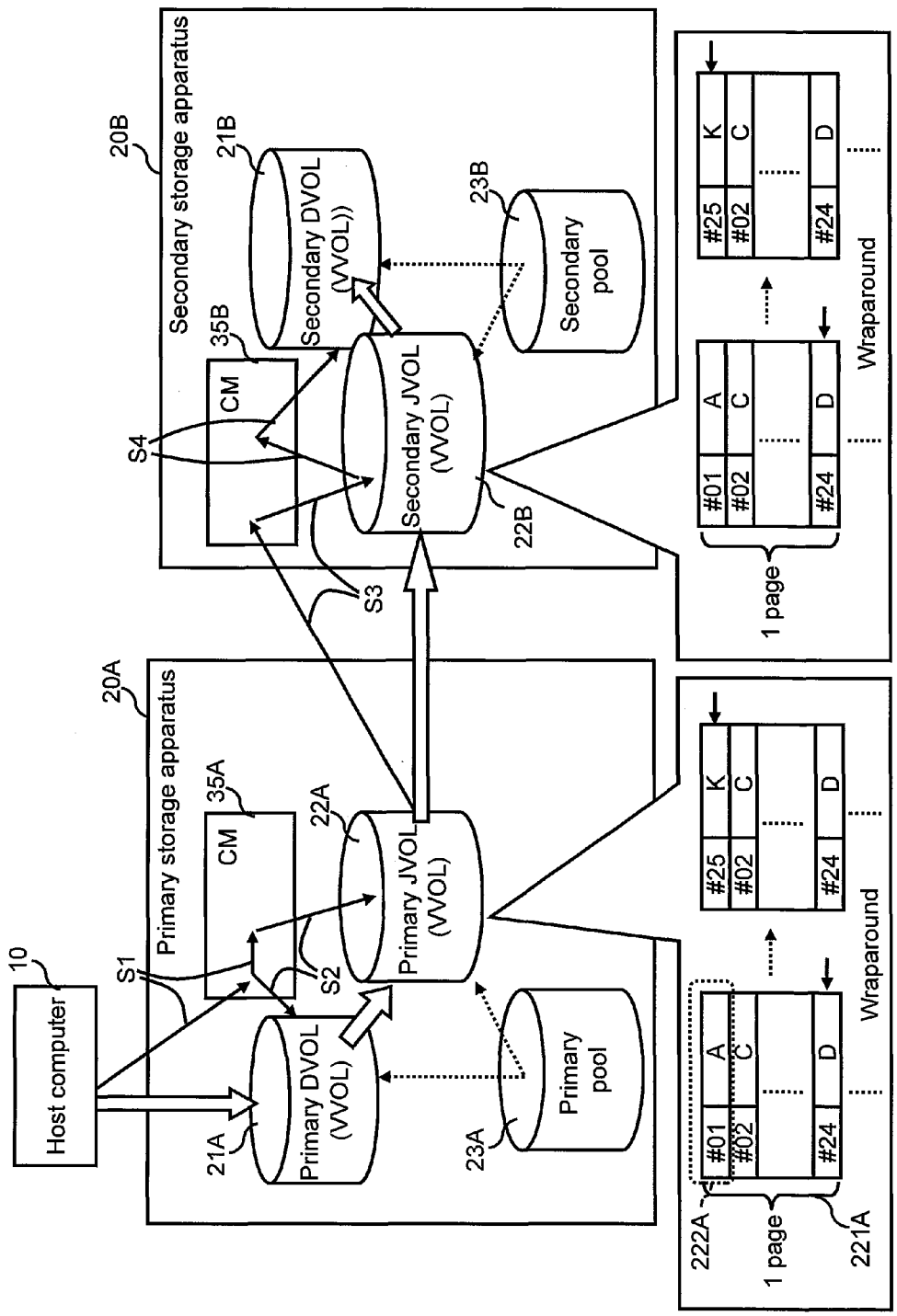
[FIG. 1]

Hereinafter, an embodiment of the present invention is explained.

It should be noted that the storage control apparatuses complying with the present invention may be a storage apparatus comprising a plurality of storage devices, a controller which the storage apparatus comprises, or may also be an intelligent switch device connected to the storage apparatus. The storage control apparatus related to an embodiment of the present invention is a storage apparatus. A plurality of actual pages configuring a pool are storage areas based on a plurality of storage devices which the storage apparatus comprises. A part of the actual pages among a plurality of actual pages configuring the pool may be the storage areas based on the storage resources in a storage apparatus outside the storage apparatus.

Furthermore, in the explanation below, each type of information might be explained by the expression of an "xxx table," but may also be expressed in other types of data configuration than tables. For indicating independence from the data configuration, the "xxx table" can be referred to as "xxx information."

Furthermore, although an ID (identifier) is used as identification information for identifying a component in the explanation below, a name, a number, and others may also be used as identification information.

Furthermore, in the explanation below, the processing might be explained by a "program" as a subject, but the subject of the processing may also be a processor because the program performs the specified processing by being performed by the processor included in a management server, a rack manager, and others (e.g. a CPU (Central Processing Unit)) while appropriately using a storage resource (e.g. a memory) and/or a communication interface device (e.g. a communication port). The processing explained by the program as a subject may also be referred to as the processing performed by a storage apparatus or a controller. Furthermore, the processor may also include a hardware circuit which performs part of or the entire processing instead of or in addition to a microprocessor such as a CPU. The computer program may also be installed in the storage apparatus from a program source. The program source may also be, for example, a program distribution server or a computer-readable storage media.

Furthermore, the management computer may also be configured of one or more computers. For example, if the management computer displays information or if the management computer transmits information for display to a remote computer, one computer is a management computer. Furthermore, for example, if a function which is equivalent to [the function of] the management computer is realized by a plurality of computers, the relevant plurality of computers (which may include a computer for display if the display is performed by the computer for display) are the management computer. An SVP (Service Processor) is the management computer in the present embodiment.

Furthermore, in the explanation below, the copy source storage apparatus in remote copy might be referred to as a "primary storage apparatus" and the copy destination storage apparatus in the remote copy might be referred to as a "secondary storage apparatus". Furthermore, the components which the primary storage apparatus comprises might be referred to by appropriately adding "primary" to the names of the same, and the components which the secondary storage apparatus comprises might be referred to by appropriately adding "secondary" to the names of the same.

Furthermore, in the explanation below, a virtual volume which is a virtual logical volume complying with Thin Provisioning (also referred to as Dynamic Provisioning) might be referred to as a "VVOL".

Furthermore, in the explanation below, only a common sign of a reference sign is supposed to be used if the same type of components is explained without distinction while a reference sign (a combination of a common sign and an individual sign) is used if the same type of components is explained distinctively. Furthermore, in the explanation below, identification information added to the components might be used instead of reference signs.

Furthermore, in the explanation below, the number might be expressed by a sign "#".

Furthermore, in the explanation below, a journal volume is referred to as a "JVOL" and a data volume is referred to as a "DVOL". To a DVOL, for example, data from a host computer (hereinafter referred to as a "host") is written. To a JVOL, a journal (hereinafter referred to as a "JNL") including management information related to data written to the DVOL and this data is written. In the management information, for example, information indicating the storage destination of the data which the JNL including the management information and an update number (hereinafter also referred to as a "sequential number" or an "SEQ #") which is a number updated each time data is written to the DVOL are included. That an update number is small indicates that the data included in the JNL is written to the DVOL at an early stage. Furthermore, that an update number is large indicates that the data included in the JNL is written to the DVOL at a late stage. Specifically speaking, by referring to this update number, the order in which the data included in each of the JNLs is written to the DVOL can be ascertained.

Furthermore, in the explanation below, a JVOL of the first storage apparatus might be referred to as a "primary JVOL" and a JVOL of the second storage apparatus might be referred to as a "secondary JVOL". However, both the primary JVOL and the secondary JVOL are not necessarily required in asynchronous remote copy. For example, the present invention can be realized even if either of the primary JVOL and the secondary JVOL is absent.

Furthermore, in the explanation below, a pool in the first storage apparatus is referred to as a "primary pool" and a pool in the second storage apparatus is referred to as a "secondary pool".

FIG. 1 shows the overview of the processing of an asynchronous type remote copy system including the storage control apparatus related to an embodiment of the present invention.

This asynchronous type remote copy system comprises a primary storage apparatus 20A and a secondary storage apparatus 20B. A host computer (hereinafter also abbreviated to a "host") 10 and the secondary storage apparatus 20B are connected to the primary storage apparatus 20A.

The primary storage apparatus 20A comprises a primary DVOL 21A, a primary JVOL 22A, a primary pool 23A, and a cache memory (hereinafter also referred to as a "CM") 35A.

The primary JVOL 22A is a virtual volume (hereinafter referred to as a primary VVOL) which is a virtual logical volume complying with Thin Provisioning (also referred to as Dynamic Provisioning). The primary JVOL 22A is configured of a plurality of virtual areas (hereinafter referred to as virtual pages) 221A. The size of each of the JNLs 222A is smaller than the size of each of the virtual pages 221A.

The primary DVOL 21A is a logical volume to which data is written from the host 10. It should be noted that the primary DVOL 21A is also a VVOL complying with Thin Provisioning as the primary JVOL 22A in the example shown in the figure. The same primary pool 23A is associated with the primary VDVOL 21A and the primary JVOL 22A, and therefore actual pages are supposed to be assigned from the same primary pool 23A.

The primary pool 23A is configured of a plurality of actual areas (hereinafter referred to as actual pages) based on a storage device which is not shown in the figure (e.g. an HDD (Hard Disk Drive)). The actual pages of the primary pool 23A are dynamically assigned to the primary JVOL 22A (the virtual page 221A) and the primary DVOL 21A.

The CM 35A is managed by being divided into a plurality of cache areas (hereinafter also referred to as slots). To the slots in the CM 35A, data read from and written to a logical volume (hereinafter referred to as a VOL), for example, data read from and written to the primary DVOL 21A, and a JNL read from and written to the primary JVOL 22A are written for once.

The secondary storage apparatus 20B comprises a secondary DVOL 21B, a secondary JVOL 22B, a secondary pool 23B, and a CM 35B. The explanation of each of the components in the secondary storage apparatus 20B is practically the same as the primary storage apparatus 20A, and therefore the explanation is omitted. It should be noted that, in the explanation below, the virtual pages configuring the primary JVOL might be referred to as primary virtual pages and the virtual pages configuring the secondary JVOL might be referred to as secondary virtual pages, and that these might be simply referred to as virtual pages if both of the above are not specifically distinguished. Furthermore, a VVOL of the secondary storage apparatus might be referred to as a secondary VVOL.

Next, the flow of write target data (hereinafter also referred to as "write data") transmitted from the host 10 is explained. The number of actual pages to be assigned to the primary JVOL 22A is made smaller than the total number of virtual pages configuring the JVOL 22A in the present embodiment. In the example shown in the figure, the number of actual pages assigned to the primary JVOL 22A is 1 only, but the number of actual pages to be assigned to the primary JVOL 22A is not limited to this.

It should be noted that a thin black arrow indicates the detailed flow of the data and a thick white arrow indicates the rough flow of the data in the figure.

The write data transmitted from the host 10 is written to the CM 35A for once, and subsequently written to the primary DVOL 21A (S1).

The JNL 222A including the write data written to the primary DVOL 21A and the management information comprising the SEQ # corresponding to the order in which the write data is written is written to the CM 35A and subsequently written to the primary JVOL 22A. This JNL 222A is written to a part of the virtual page 221A (S2). As explained above, the size of a JNL 222A is smaller than the size of a virtual page 221A, and therefore a plurality of JNLs 222A can be written to a primary virtual page 221A.

The JNL 222A written to the primary JVOL 22A is transmitted from the primary storage apparatus 20A to the secondary storage apparatus 20B, written to the CM 35B, and subsequently written to the secondary JVOL 22B (S3). It should be noted that, according to the example shown in the figure, the number of actual pages assigned to the secondary JVOL 22B is 1 only as the number of actual pages assigned to the primary JVOL 22A. However, the number of actual pages assigned to the secondary JVOL 22A is not limited to this.

A plurality of non-reflected JNLs in the secondary JVOL 22B are sequentially reflected in the secondary DVOL 21B in ascending order of updating (in ascending order of SEQ #'s). Specifically speaking, the JNLs are read from the secondary JVOL 22B to the CM 35B, and the write data in the JNLs is written to the secondary DVOL 21B (S4). By this method, it is considered that remote copy of the write data written to the primary DVOL 21A to the secondary DVOL 21B is performed.

If write data complying with a write request specifying the primary DVOL 21A is newly transmitted from the host 10, the above-mentioned processing from S1 to S4 is also performed for the write data. In such case, if a large free area which is equal to or larger than the size of the JNL 222A exists in the assigned actual page, the controller in the primary storage apparatus 20A writes the JNL 222A to the free area. However, if no free area equal to or larger than the size of the JNL 222A exists in the assigned actual page, wraparound is performed, that is, the area where the oldest JNL for which the copy is completed in the actual page (the JNL which is already transferred to the secondary storage apparatus 20B and also reflected in the secondary storage apparatus 20B and whose SEQ # is the smallest in the primary JVOL 22A) is written is overwritten by a new JNL.

[The processing is] explained more concretely with reference to FIG. 1. In the example shown in the figure, 24 JNLs from SEQ #1 to #24 are written to the actual page which is assigned to the primary virtual page 221A, and the actual page does not comprise a free area to which new JNLs (SEQ #25 and subsequent JNLs) can be added. In the example shown in the figure, data "A" is included in the JNL SEQ #1, data "C" is included in the JNL SEQ #2, and data "D" is included in the JNL SEQ #24. Of the JNLs written to the actual page, the JNL SEQ #1 is the oldest, and the JNL SEQ #24 is the newest.

If a new JNL SEQ #25 is to be newly written to the primary JVOL 22A, no free area in which the new JNL can be stored exists in the assigned actual page, and therefore the primary storage apparatus 20A overwrites the area to which the JNL of the smallest SEQ # (the JNL SEQ #1) is written by the new JNL (the JNL SEQ #25).

As explained above, in the present embodiment, if no area where a new JNL can be stored in the smaller number of assigned actual pages (one actual page in the example shown in the figure) than the number of virtual pages 221A configuring the primary JVOL 22A exists (if no free area larger than the size of a JNL exists), wraparound is performed, that is, the area where the oldest JNL for which the copy is completed is stored is overwritten by the new JNL. Specifically speaking, in the present embodiment, the number of actual pages to be assigned from the primary pool 23A to the primary JVOL 22A can be made smaller than the number of virtual pages 222A configuring the primary JVOL 22A. Therefore, even if the VVOL is adopted as a primary JVOL 22A, the number of actual pages used by the primary pool 23A can be inhibited.

It should be noted that the actual page assigned from the primary pool 23A to the primary JVOL 22A is only one in the example shown in the figure. This can contribute to the prevention of the I/O (Input/Output) performance deterioration of the primary storage apparatus 20A.

Specifically speaking, for writing a JNL to the primary JVOL 22A, the JNL is written to the CM 35A for once, that is, specifically speaking, the primary storage apparatus 20A secures a cache area whose write destination is the JNL (e.g. a free cache area or a clean cache area which stores the data stored in the VOL only) from the CM 35A and writes the JNL to the secured cache area. Therefore, the primary storage apparatus 20A might have to secure a cache area each time [the primary storage apparatus 20A] is supposed write a JNL to the primary JVOL 22A.

However, in the example shown in the figure, since the actual page assigned to the primary JVOL 22A is 1 only, no specific problem occurs even if a cache area for the actual page is secured in the CM 35A in advance because the storage area of sufficient capacity still remains in the CM 35A. Subsequently, if a cache area is secured for the one actual page in advance, it becomes unnecessary to secure a cache area each time a JNL is written to the primary JVOL 22A. Therefore, the prevention of the I/O (Input/Output) performance deterioration of the primary storage apparatus 20A can be expected.

It should be noted that the size of a cache area which is secured for the primary JVOL 22A in the CM 35A in advance is not limited to the size of an actual page. A cache area for the amount of the total capacity of K units of actual pages (K is larger than one and smaller than the number of virtual pages configuring the primary JVOL 22A) may also be secured in the CM 35A in advance in accordance with the capacity of the CM 35A. In this case, the maximum number of actual pages assigned to the primary JVOL 22A may be K.

Furthermore, a cache area for the primary JVOL 22A may not have to be secured in the CM 35A in advance. However, once securing a cache area for an actual page assigned to the primary JVOL 22A, the controller 30A may also keep the cache area secured without releasing the same. By this method, it becomes unnecessary thereafter to secure a cache area when writing a JNL to the actual page.

Furthermore, from the perspective of preventing the I/O performance deterioration of the primary storage apparatus 20A, N units of actual pages may also be assigned to the primary JVOL 22A in advance. N is an integer which is 1 or larger and smaller than M which is the number of actual pages assigned to all the areas of the primary JVOL 22A (M is an integer with the condition of N<M). M is the same value as the number of virtual pages.

What is explained above about the primary storage apparatus 20A can also be applied to the secondary storage apparatus 20B. Specifically speaking, the number of actual pages assigned to the secondary JVOL 22B can be made smaller than the number of virtual pages configuring the secondary JVOL 22B (e.g. the number of actual pages assigned to the secondary JVOL 22B can be made 1 only), and wraparound is performed for the assigned actual pages. Generally, for writing a JNL to the secondary JVOL 22B, a cache area for writing the JNL is also secured in the secondary storage apparatus 20B from the CM 35B, but a cache area for the number of actual pages assigned to the secondary JVOL 22B may also be secured in advance in this embodiment.

Furthermore, it may also be permitted that a cache area is secured in advance from the CM(s) 35A (and/or 35B) only for a part of the maximum number of actual pages assigned to the JVOL(s) 22A (and/or 22B), and that [the cache area] for the others is secured when writing a JNL to the secondary JVOL(s) 22A (and/or 22B).

Furthermore, each time receiving a JNL from the primary storage apparatus 20A and writing the JNL to the CM 35B (or the secondary JVOL 22B), the secondary storage apparatus 20B (e.g. the controller in the secondary storage apparatus 20B) may return a response indicating that the JNL is already transferred (e.g. a response including the SEQ # which the received JNL comprises) to the primary storage apparatus 20A. If receiving such response, the primary storage apparatus 20A can manage the status of the JNL (the JNL in the primary JVOL 22A) corresponding to the response as transferred. However, even if being transferred to the secondary storage apparatus 20B, the JNL in the primary JVOL 22A should preferably remain in the primary JVOL 22A until being reflected in the secondary DVOL 21B. This is because, if a failure occurs in the secondary storage apparatus 20B and if the primary storage apparatus 20A is required by the SVP 50, the secondary storage apparatus 20B, and others to retransmit the JNL which is not reflected in the secondary DVOL 21B to the secondary storage apparatus 20B, the JNL cannot be retransmitted if the JNL which is not reflected in the secondary DVOL 21B does not remain in the primary JVOL 22B.

Furthermore, each time reflecting a JNL in the secondary JVOL 22B (each time writing the write data in the JNL to the secondary DVOL 21B), the secondary storage apparatus 20B may return a response indicating that the JNL is already reflected (e.g. a response including the SEQ # which the JNL comprises) to the primary storage apparatus 20A. If receiving such response, the primary storage apparatus 20A can manage the status of the JNL (the JNL in the primary JVOL 22A) corresponding to the response as copied. The JNL including the write data written to the secondary JVOL 22B may be deleted from both the secondary JVOL 22B and the primary JVOL 22A.

Furthermore, that the maximum number of actual pages assigned to the JVOL (VVOL) is smaller than the number of virtual pages configuring the JVOL (VVOL) may also be ensured in only either the primary storage apparatus 20A or the secondary storage apparatus 20B.

Hereinafter, the present embodiment is explained in detail. At this step, the items related to the primary storage apparatus 20A are explained in detail and, since most of the above is common to the secondary storage apparatus 20A, the explanation of the secondary storage apparatus 20A is appropriately omitted.

Figure 2:
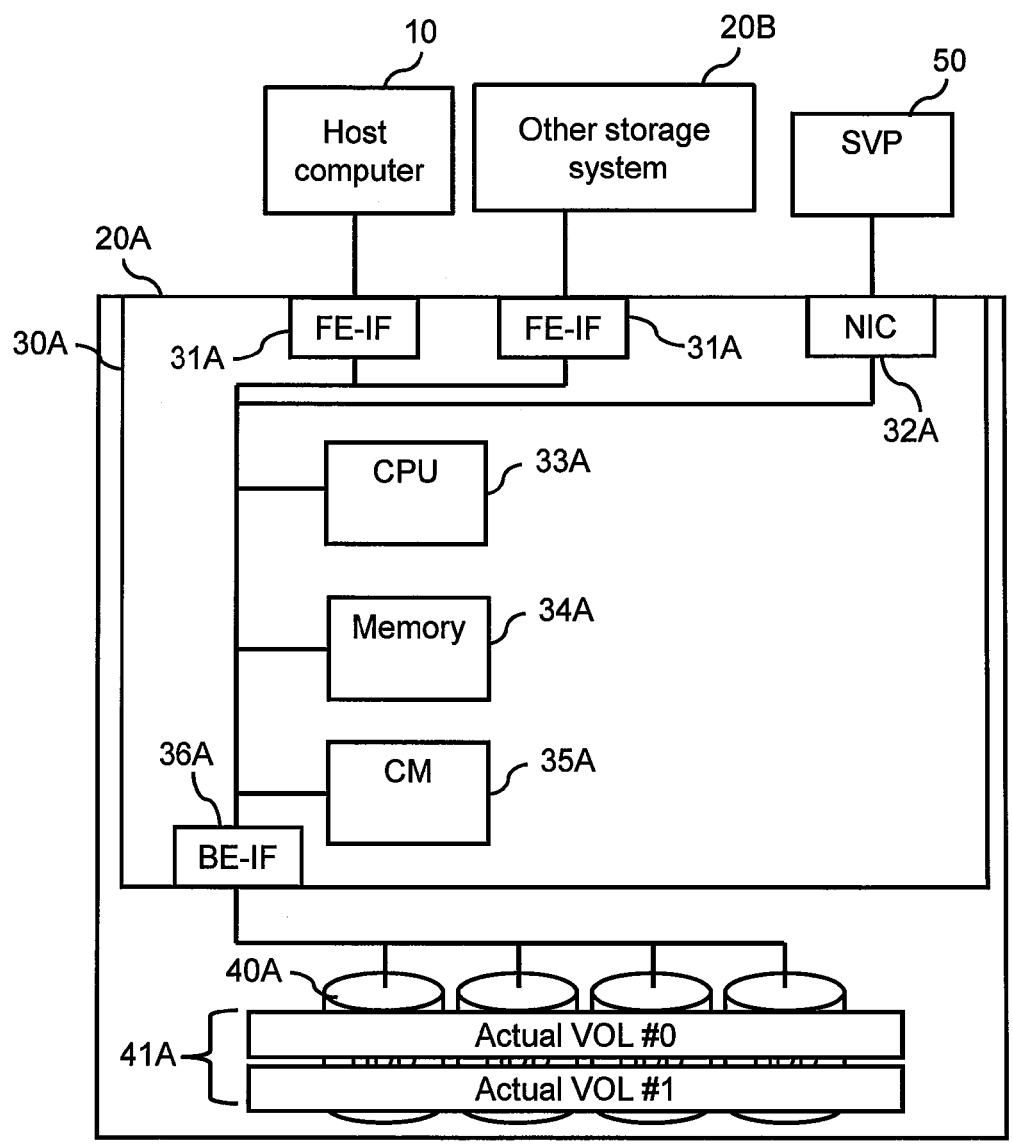
[FIG. 2]

FIG. 2 shows a configuration example of the primary storage apparatus 20A.

The primary storage apparatus 20A comprises a controller 30A and a plurality of storage devices 40A. A storage device 40A is an HDD (Hard Disk Drive) for example. A RAID (Redundant Array of Independent (or Inexpensive) Disks) group is configured of a plurality of storage devices 40A, and an actual VOL (hereinafter also referred to as an "actual VOL") 41A is created based on each of the RAID groups. The actual VOL 41 may be a component of the pool without being provided to the host 10 or may also be a DVOL provided to the host 10. In the former case, the actual VOL 41 may be divided into a plurality of actual pages. It should be noted that a physical storage device such as a tape or a flash memory may also be adopted as a storage device 40A instead of an HDD.

The controller 30A comprises a plurality of front end interface devices (hereinafter also referred to as FE-IFs) 31A, an NIC (Network Interface Card) 32A, a CPU (Central Processing Unit) 33A, a memory 34A, the CM 35A, and a backend interface device (hereinafter also referred to as a BE-IF) 36A. Although the processing performed by the controller 30A may be performed by the CPU 33A performing one or more computer programs, part of the processing at least may also be performed by the hardware circuit.

The host 10 and the secondary storage apparatus 20B are connected to a plurality of FE-IFS 31A. The controller 30A (CPU 33A) communicates with the host 10 and the secondary storage apparatus 20B via the FE-IFs 31A.

The SVP (SerVice Processor) 50 is connected to the NIC 32A. The SVP 50 is an example of the management computer.

The CPU 33A controls the processing of the controller 30A. Various types of information and programs required for the controller 30A to control the primary storage apparatus 20A are stored in the memory 34A. The CPU 33A realizes various functions by performing the various programs based on the various types of information stored in the memory 34A.

The CM 35A stores the data written to the storage device 40A and the data read from the storage device 40A. The CM 35A may also be integrated with the memory 34A.

The storage device 40A is connected to the BE-IF 36A. The controller 30A (CPU 33A) writes the data to the storage device 40A which is the base of the write destination VOL (e.g. the actual pages assigned to the primary DVOL 21A or the primary JVOL 22A) via the BE-IF 36A.

The configuration of the primary storage apparatus 20A is explained above. It should be noted that the controller 30A may also comprise other types of configurations, not limited to the configuration shown in FIG. 2.

It should be noted that the configuration of the secondary storage apparatus 20B is practically the same as the configuration of the primary storage apparatus 20A, and therefore the explanation of the secondary storage apparatus 20B is omitted.

Figure 3A:
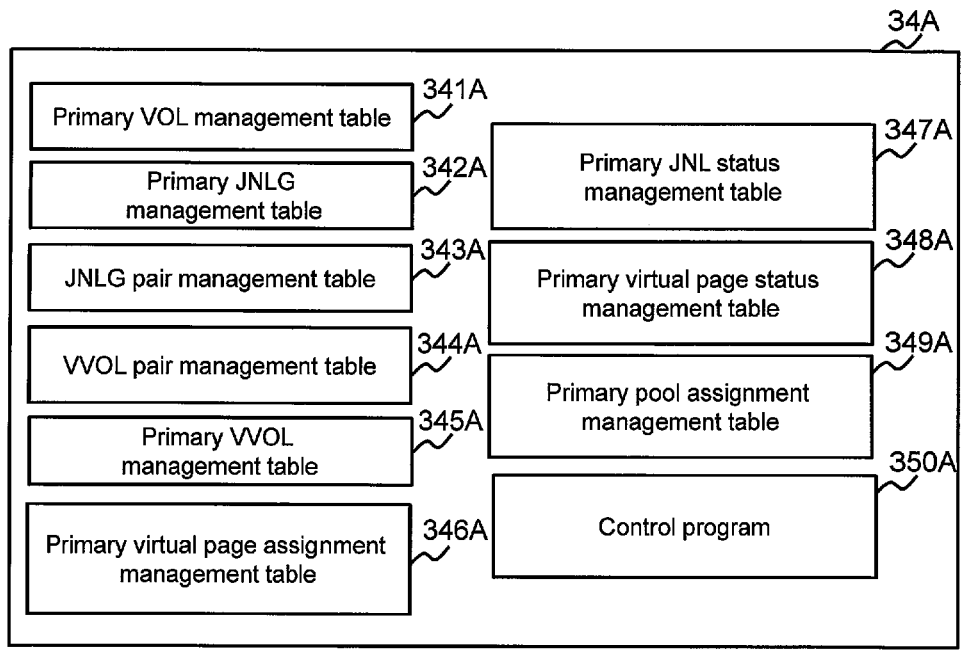
FIG. 3A shows an example of management tables and a program stored in the memory of the primary storage apparatus 20A.

FIG. 3A shows an example of management tables and a program stored in the memory 34A of the primary storage apparatus 20A.

A primary VOL management table 341A, a primary journal group (hereinafter also referred to as a "primary JNLG") management table 342A, a JNLG pair management table 343A, a VVOL pair management table 344A, a primary VVOL management table 345A, a primary virtual page assignment management table 346A, a primary JNL status management table 347A, a primary virtual page status management table 348A, a primary pool assignment management table 349A, and a control program 350A are stored in the memory 34A.

The primary VOL management table 341A is a table for managing all the VOLs that the primary storage apparatus 20A comprises. The VOLs are either VVOLs or actual VOLs.

The primary JNLG management table 342A is a table for managing the primary JNLG in the primary storage apparatus 20A. The JNLG indicates a set of volumes configured of one or more logical VOLs for storing data and logical VOLs for storing JNLs.

The JNLG pair management table 343A is a table for managing the status of a pair of a primary JNLG and a JNLG in the secondary storage apparatus 20B (hereinafter also referred to as a secondary JNLG).

The VVOL pair management table 344A is a table for managing the status of a pair of a primary VVOL and a secondary VVOL.

The primary VVOL management table 345A is a table for managing the primary VVOLs.

The primary virtual page assignment management table 346A is a table for managing which actual page is assigned to the primary virtual page from the primary pool.

The primary JNL status management table 347A is a table for managing the status of the JNL (primary JNL) processed in the primary storage apparatus 20A.

The primary virtual page status management table 348A is a table for managing the status of the primary virtual page.

The primary pool assignment management table 349A is a table for managing which primary JVOL the primary pool is assigned to.

The control program 350A is a computer program for the CPU 33A to control the primary storage apparatus 20A.

Figure 3B:
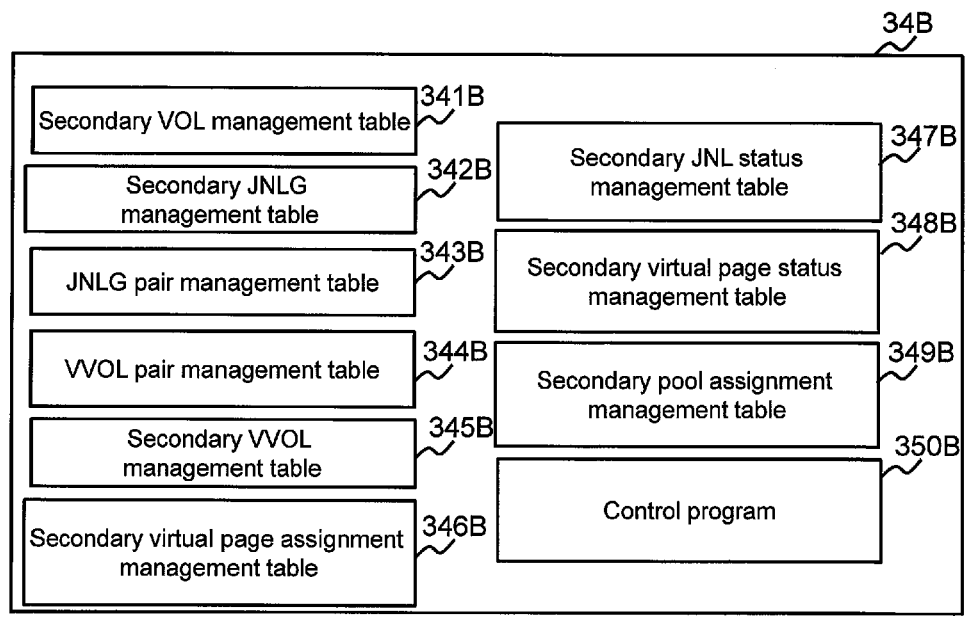
FIG. 3B shows an example of management tables and a program stored in the memory of the secondary storage apparatus 20B.

FIG. 3B shows an example of management tables and a program stored in the memory 34B of the secondary storage apparatus 20B.

A secondary VOL management table 341B, a secondary JNLG management table 342B, a JNLG pair management table 343B, a VVOL pair management table 344B, a secondary VVOL management table 345B, a secondary virtual page assignment management table 346B, a secondary JNL status management table 347B, a secondary virtual page status management table 348B, a secondary pool assignment management table 349B, and a control program 350B are stored in the memory 34B.

These management tables are practically the same as the management tables stored in the memory 34A of the primary storage [apparatus] 20A, and therefore the explanation is omitted.

Figure 4:
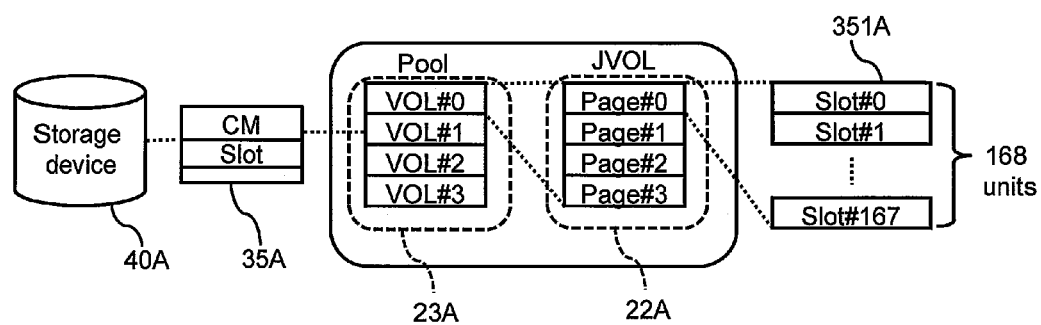
[FIG. 4]

FIG. 4 shows the relationship between the capacity of the slot of the CM 35A and the actual pages assigned to the primary JVOL 22A.

The CM 35 is configured of a plurality of slots (cache areas) 351A. The capacity of a virtual page 221A (an actual page) is equal to the capacity of a specified number of (e.g. 168) slots 351A. As explained in FIG. 1, the data read from and written to the VOL (e.g. the primary DVOL 21A and the primary JVOL 22A) is written to the CM 35A for once. The pool 23A is configured of a plurality of actual VOLs, each of which is divided into a plurality of actual pages, which are assigned to the virtual pages.

In the present embodiment, a specified number of slots in the CM 35A (the slots for the same amount (168) as the capacity of a page in the example of FIG. 1) 351A are secured for the primary JVOL 22A in advance. For example, if the slots for the amount of K units of virtual pages 221A (K is larger than 1 and is smaller than the number of virtual pages configuring the primary JVOL 22A) are secured in the CM 35A in advance, (168×K) units of slots are secured in advance.

As explained above, if the slots for the amount of the specified number of virtual pages in the CM 35A are secured in advance, the operation of securing the slots in the CM 35A when writing the JNL to the primary JVOL 22A is omitted. Therefore, the prevention of the performance deterioration of the primary storage apparatus 20A can be expected. Furthermore, as shown in FIG. 1, if the number of actual pages assigned to the primary JVOL 22A is 1 (abstractly, for the amount of the number of pages equal to or smaller than the specified ratio of the capacity of the primary JVOL 22A), the number of slots secured in advance (the cache capacity) can be saved.

It should be noted that the relationship between the slot capacity of the CM 35B and the pages assigned to the secondary JVOL 22B in the secondary storage apparatus 20B is practically the same as the relationship between the slot capacity of the CM 35A and the pages assigned to the primary JVOL 22A, and therefore the explanation is omitted.

Figure 5:
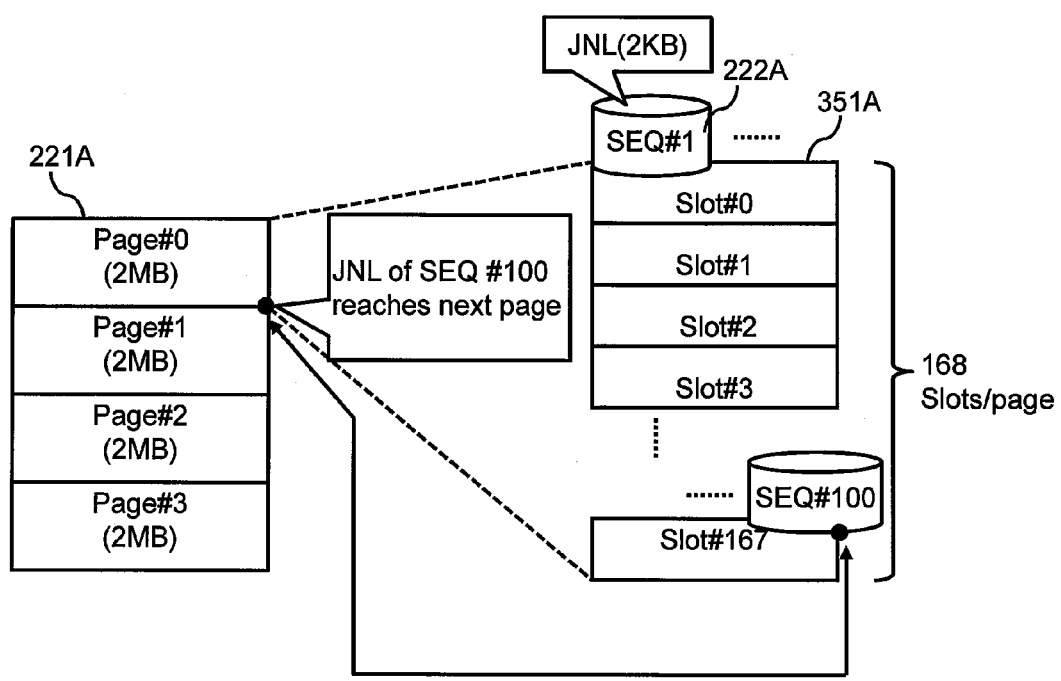
[FIG. 5]

FIG. 5 shows the relationship between the capacity of each of the pages and the capacity of each of the JNLs. The primary storage apparatus 20A is also explained as an example at this step.

As explained in FIG. 4, the capacity of a virtual page 221A is equal to the capacity of 168 slots. The capacity of a virtual page 221A is 2 MB for example. The capacity of a JNL 222A is 2 KB for example.

The controller 30A writes the JNL 222A first to the head of the primary virtual page 221A. At this step, even though a free area exists in the actual page assigned to the virtual page 221A, the capacity of the free area might be smaller than the size of the JNL 222A. In this case, for using as much the free area as possible, writing a part of the JNLs 222A (the JNL SEQ #100 in the example shown in the figure) to the actual page and writing the rest of the JNLs 222A to the other actual pages can be considered.

However, in the present embodiment, instead of writing one JNL 222A across the two actual pages as explained above, the controller 30A assigns a free actual page to the other virtual pages than the virtual page which is the assignment destination of the actual page with the small free area from the pool 23A. At this step, if the number of assigned actual pages reaches a specific number (the number smaller than the number of virtual pages configuring the primary JVOL), the controller 30A overwrites the area where the oldest [JNL] for which the copy is completed is stored in one or more actual pages assigned to the primary JVOL 22A by a new write target JNL (wraparound).

By the above-mentioned processing, the JNL 222A can be prevented from being written across a plurality of actual pages.

Figure 6:
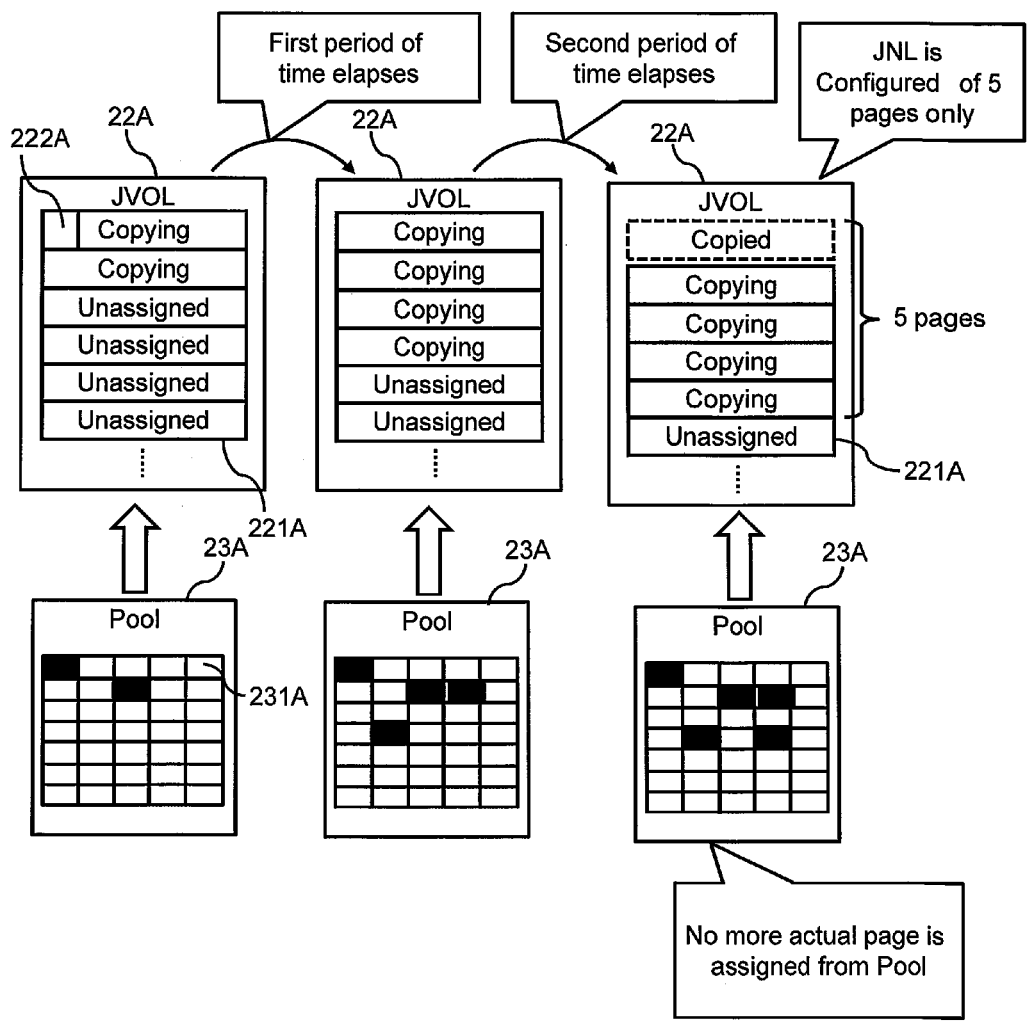
[FIG. 6]

FIG. 6 shows the overview of the processing of the controller 30A. It should be noted that the number of actual pages assigned to the primary JVOL 22A is a variable value instead of a fixed value in the explanation of FIG. 6. Specifically speaking, FIG. 6 shows an example of the fact that the number of actual pages assigned to the primary JVOL 22A is not fixed (however, the number of actual pages assigned to the primary JVOL 22A is smaller than the number of virtual pages configuring the primary JVOL 22A as the above-mentioned explanation).

For example, the JNL 222A is copied in units of virtual pages by the controller 30A. Specifically speaking, copy is performed for each of the JNL groups (all the JNLs stored in the virtual page) stored in a virtual page (to be more exact, the actual page assigned to the virtual page) from the primary storage apparatus 20A to the secondary storage apparatus 20B. Although the JNL is transmitted from the primary storage apparatus 20A to the secondary storage apparatus 20B in response to a read command transmitted from the secondary storage apparatus 20B to the primary storage apparatus 20A, instead of the above, [the JNL] may also be transmitted with the write command from the primary storage apparatus 20A to the secondary storage apparatus 20B.

The controller 30A manages the status of each of the virtual pages 221A in the primary JVOL 22A.

The status of the virtual page 221A to which no actual page is assigned is "unassigned".

If writing a JNL to an "unassigned" virtual page 221A for the first time, the controller 30A assigns an actual page to the virtual page 221A, writes the JNL to the assigned actual page, and changes the status of the virtual page 221A to "not copied".

If [the controller 30A] transferred at least one JNL from the "not copied" virtual page to the secondary storage apparatus 20B, the controller 30A changes the status of the virtual page from "not copied" to "copying". "Copying" indicates that, although at least one JNL started to be transferred from the virtual page to the secondary storage apparatus 20B, all of the specified number (e.g. the maximum number of JNLs which can be written to the actual page) of JNLs written to the virtual page are not reflected in the secondary DVOL 21B yet, in other words, that the JNLs stored in the actual page assigned to the virtual page cannot be erased yet. Therefore, the virtual page 221A in "copying" is relevant to any of the conditions, for example, from (A) to (C) below, (A) the condition where none of the JNLs are transferred from the virtual page to the secondary JVOL 22B,
(B) the condition where at least one of the JNLs was transferred from the virtual page to the secondary JVOL 22B but none of the above is reflected in the secondary DVOL 21B, and
(C) the condition where at least one of the JNLs was transferred from the virtual page to the secondary JVOL 22B and reflected in the secondary DVOL 21B, but all of the JNLs in the virtual page are not reflected in the secondary DVOL 21B yet. It should be noted that the status of "copying" may also be divided into a plurality of more detailed statuses to be able to ascertain which of the above-mentioned conditions from (A) to (C) is relevant.

A JNL 222A is added to the actual page assigned to the virtual page 221A. If the free capacity of the actual page becomes smaller than the size of the JNL 222A, the controller 30A newly assigns a free actual page 231A to a virtual page next to the virtual page to which the actual page is assigned, and writes the JNL 222A to the newly assigned actual page 231A. The status of the virtual page to which the actual page is newly assigned is changed to the status "copying" as shown in the figure if any JNLs are transferred from the virtual page.

As explained above, if a certain period of time (a first period of time shown in the figure) elapses, the JNLs written to the primary JVOL 22A increase and the actual pages assigned to the primary JVOL 22A increase and, at the same time, the virtual pages in the status "copying" increase.

Subsequently, in due time (if further a second period of time shown in the figure elapses), the status of the virtual page whose status was changed to "copying" first is changed to "copied". "Copied" indicates that all the JNLs in the virtual page are reflected in the secondary DVOL 21B, in other words, all the JNLs in the virtual page may be erased.

When or after there are H units (e.g. H=1) of "copied" virtual pages, the controller 30A stops the new assignment of actual pages to the primary JVOL 22A. Specifically speaking, if a new JNL 222A is written to the primary JVOL 22A at the point of time and thereafter, the controller 30A does not assign a new free actual page to the other virtual pages even if the capacity of the free area in the actual page which is recently assigned to the primary JVOL 22A is smaller than the JNL. The controller 30A writes the write target JNL 222A to the area where the oldest JNL in the actual page assigned to the "copied" virtual page 221A is stored. In the example shown in the figure, 5 which is the number of actual pages 231A assigned to the primary JVOL 22A is smaller than the number of virtual pages 221A configuring the primary JVOL 22A.

It should be noted that the above-mentioned H which is the number of "copied" virtual pages may also be an integer larger than 1 if the number is smaller than the number of virtual pages 221A configuring the primary JVOL 22A.

Furthermore, the controller 20A may also transfer JNLs to the secondary storage apparatus 20B in units of JNLs instead of transferring JNLs to the secondary storage apparatus 20B in units of virtual pages. For example, if the communication load with the secondary storage apparatus 20B is smaller than a specified load (e.g. if the bands of the primary storage apparatus 20A and of the secondary storage apparatus 20B are vacant by a specified value or larger, if the usage rate of the CPU 33A is smaller than a specified value, and in other cases), and if the JNLs are transferred to the secondary storage apparatus 20B in units of virtual pages and the communication load is equal to or larger than the specified load (e.g. the transfer of JNLs is delayed) the controller 20A may also terminate the transfer of the JNLs to the secondary storage apparatus 20B in units of virtual pages and transfer the JNLs to the secondary storage apparatus 20B in units of JNLs. If the communication load is equal to or larger than the specified load, more JNLs can be expected to be transferred in the same length of time by the transfer in units of JNLs, and therefore the status "copied" can be expected to be acquired sooner as the status of the copy source virtual page, and eventually the number of actual pages assigned to the primary JVOL 22A can be expected to be reduced.

It should be noted that the controller 20A may manage the status of each of the JNLs since starting the JNL transfer in units of JNLs until returning [the transfer] to the JNL transfer in units of virtual pages (or while performing the JNL transfer in units of virtual pages also). For example, if a JNL is transferred to the secondary storage apparatus 20 but not reflected in the secondary DVOL 21B, the controller 20A may manage the status of the JNL as "copying", and may manage the status of the JNL as "copied" if the JNL is reflected in the secondary DVOL 21B. When or after there are J units of "copied" JNLs, the controller 30A may stop the new assignment of actual pages to the primary JVOL 22A. The value of J is 1 or larger for example, and equal to or smaller than (H×T) at the same time (T is the number of JNLs stored in a virtual page).

Furthermore, the controller of the secondary storage apparatus 20B may also monitor the communication load and, based on the result, switch in which of units JNLs should be transferred, virtual pages or JNLs. For example, the secondary storage apparatus 20B may transmit a first type of read command for reading JNLs in units of virtual pages to the primary storage apparatus 20A, and may transmit a second type of read command for reading JNLs in units of JNLs to the primary storage apparatus 20A after detecting that the communication load becomes equal to or larger than the specified load.

FIG. 7A shows a configuration example of the primary virtual page bitmap 70A.

The primary virtual page bitmap 70A is stored in the memory 34A. By referring to the primary virtual page bitmap 70A, the CPU 33A can ascertain which JNL of which JNLG (journal group) is copied to (reflected in) the secondary DVOL 22B.

The primary virtual page bitmap 70A comprises a plurality of bits 72 per JNLG # 71A. Each of the bits corresponds to the SEQ # of a JNL. If an SEQ #n (n is any of the integers which is 0 and larger) is copied, the n-th bit is on (e.g. 1). As for a JNLG of JNLG #1, after transferring a JNL of SEQ #n, if receiving a notification indicating that the JNL is reflected in the secondary DVOL 21B from the secondary storage apparatus 20B, the CPU 33A sets the bit corresponding to the JNLG #1 and the SEQ #n to on.

It should be noted that a JNLG is a set of one or more DVOLs and one or more JVOLs. As JNLGs, primary JNLGs and secondary JNLGs exist. A primary JNLG is a set of one or more primary DVOLs and one or more primary JVOLs. A secondary JNLG is a set of one or more secondary DVOLs and one or more secondary JVOLs.

FIG. 7B shows a configuration example of the JNLG usage condition management table 700A.

The JNLG usage condition management table 700A is stored in the memory 34A. The JNLG usage condition management table 700A stores each JNLG by associating a JNLG # 701A, a usage rate 702A, a total number of pages 703A, and a number of pages in use 704A.

The JNLG # 701A is a number for identifying the JNLG.

The usage rate 702A is information indicating the rate of the capacity of all the JNLs to the total capacity of the JNLG.

The total number of pages 703A is information indicating the number of all the pages that the JNLG comprises.

The number of pages in use 704A is information indicating the number of pages in which the JNLs are stored among all the pages that the JNLG comprises. The usage rate 702A is ascertained based on the total number of pages 703A and the number of pages in use 704A.

It should be noted that, although the secondary virtual page bitmap and the JNLG usage condition management table may also be stored in the memory 34B of the secondary storage apparatus 20B, those are practically the same as the primary virtual page bitmap 70A and the JNLG usage condition management table 700A of the primary storage apparatus 21A respectively, and therefore the explanation is omitted.

FIG. 8A shows a configuration example of the primary VOL management table 341A.

The primary VOL management table 341A stores each VOL of the primary storage apparatus 20A by associating a VOL # 81A, a usage condition 82A, a JNLG # 83A, a VOL attribute 84A, an emulation type 85A, and a capacity 86A.

The VOL # 81A is a number for identifying the VOL which the primary storage apparatus 20A comprises.

The usage condition 82A is information indicating whether the VOL is being used or not. In the example shown in the figure, "in use" is shown if the VOL is being used and "unused" is shown if the VOL is not being used, but the notation is not limited to this.

The JNLG # 83A is an identification number of a JNLG to which the VOL belongs.

The VOL attribute 84A is information indicating the usage of the VOL. For example, the VOL attribute 84A is "Data" if the VOL is a DVOL, [the attribute is] "JNL" if the VOL is a JVOL, and "Pool VOL" is shown if the VOL is a pool VOL (the VOL to be the component of the pool). It should be noted that no pool VOL is included in the JNLGs.

The emulation type 85A is information indicating the emulation type of the VOL (the format type of data allocation in the VOL). As explained later, VOLs (JVOLs, DVOLs) of the same emulation type may be paired.

The capacity 86A is information indicating the capacity of the VOL. Although the unit of the capacity is "GB" (gigabyte) in the example shown in the figure, the unit is not limited to this.

FIG. 8B shows a configuration example of the secondary VOL management table 341B.

The secondary VOL management table 341B stores each VOL of the secondary storage apparatus 20B by associating a VOL # 81B, a usage condition 82B, a JNLG # 83B, a VOL attribute 84B, an emulation type 85B, and a capacity 86B. It should be noted that the secondary VOL management table 341B is nearly the same in the configuration as the primary VOL management table 341A, and therefore the explanation is omitted.

FIG. 9A shows a configuration example of the primary JNLG management table 342A.

The primary JNLG management table 342A stores each VOL belonging to the primary JNLG by associating a primary JNLG # 91A, a VOL # 92A, and a VOL attribute 93A.

The primary JNLG # 91A is an identification number of the primary JNLG to which the VOL belongs. The VOL # 92A is an identification number of the VOL. The VOL attribute 93A is information indicating the attribute of the VOL (whether a DVOL or a JVOL).

By referring to the primary JNLG management table 342A, the CPU 33A can determine which VOL belonging to which primary JNLG is what type of VOL (whether a JVOL or a DVOL).

FIG. 9B shows a configuration example of the secondary JNLG management table 342B.

The secondary JNLG management table 342B stores each VOL belonging to the secondary JNLG by associating a JNLG # 91B, a VOL # 92B, and a VOL attribute 93B. Since the secondary JNLG management table 342B is practically the same in the configuration as the primary JNLG management table 342A, the explanation is omitted.

FIG. 10 shows a configuration example of the JNLG pair management table 343A.

The JNLG pair management table 343A comprises a primary JNLG # 101, a secondary JNLG # 102, and a status 103 for each JNLG pair.

The primary JNLG # 101 is an identification number of a primary JNLG in a JNLG pair, and the secondary JNLG # 102 is an identification number of a secondary JNLG in the JNLG pair.

The status 103 is information indicating the status of the JNLG pair. "PAIR" indicates that the primary JNLG and the secondary JNLG are consistent with each other about the data (the primary DVOL and the secondary DVOL are consistent). "SIMP" indicates that the primary JNLG and the secondary JNLG are not paired yet. "COPY" indicates that the primary JNLG and the secondary JNLG are paired a pair but that the data is not consistent.

By referring to the JNLG pair management table 343A, the CPU 33A can determine which primary JNLG and which secondary JNLG are paired and the status of the JNLG pair.

Figure 11:
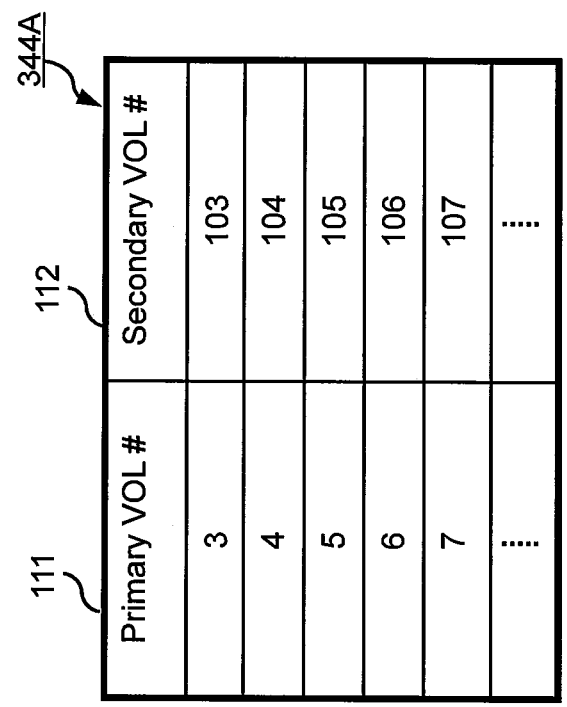
[FIG. 11]

FIG. 11 shows a configuration example of the VOL pair management table 344A.

The VOL pair management tables 344A, 344B store each VOL pair by associating a primary VOL # 111 with a secondary VOL # 112. The primary VOL # 111 is an identification number of a primary VOL in the VOL pair, and the secondary VOL # 112 is an identification number of a secondary VOL in the VOL pair.

By referring to the VVOL pair management table 344A, the CPU 33A can determine which primary VOL and which secondary VOL are paired.

Since the VVOL pair management table 344B (refer to FIG. 3B) is practically the same in the configuration as the VVOL pair management table 344A, the explanation is omitted.

FIG. 12A shows a configuration example of the primary VVOL management table 345A.

The primary VVOL management table 345A stores each primary VVOL by associating a primary VVOL # 121A, a Pool # 122A, and a capacity 123A.

The primary VVOL # 121A is an identification number of the primary VVOL (a primary DVOL or a primary JVOL). The Pool # 122A is an identification number of a pool with which the primary VVOL is associated (the pool to be the assignment source of the actual pages to the primary VVOL). The capacity 123A indicates the capacity of the primary VVOL.

FIG. 12B shows a configuration example of the secondary VVOL management table 345B.

The secondary VVOL management table 345B stores each secondary VVOL by associating a secondary VVOL # 121B, a Pool # 122B, and a capacity 123B. Since the secondary VVOL management table 345B is practically the same in the configuration as the primary VVOL management table 345A, the explanation is omitted.

FIG. 13A shows a configuration example of the primary virtual page assignment management table 346A.

The primary virtual page assignment management table 346A exists in each primary VVOL. The primary virtual page assignment management table 346A stores each primary virtual page by associating a virtual page # 131A and an actual page # 132A. The virtual page # 131A is an identification number of the virtual page and the actual page # 132A is an identification number of an actual page assigned to the virtual page. If no actual page is assigned to the virtual page, the actual page # 132A corresponding to the virtual page is a value indicating that no actual page is assigned.

By referring to the primary virtual page assignment management table 346A and the above-mentioned primary VVOL management table 345A, the CPU 33A can determine whether an actual page is assigned to a primary virtual page or not and from which pool which actual page is assigned to the primary virtual page.

FIG. 13B shows an example of the secondary virtual page assignment management table 346B.

The secondary virtual page assignment management table 346B exists in each secondary VVOL. The secondary virtual page assignment management table 346B stores each secondary virtual page by associating a virtual page # 131B and an actual page # 132B. Since the secondary virtual page assignment management table 346B is practically the same in the configuration as the primary VOL management table 345A, the explanation is omitted.

FIG. 14 shows a configuration example of the primary JNL status management table 347A.

The primary JNL status management table 347A exists in each primary JVOL. The primary JNL status management table 347A stores each JNL in the primary JVOL by associating a primary virtual page # 141A, a status 142A, a page starting address 143A, a page ending address 144A, a JNL starting address 145A, a JNL ending address 146A, and an SEQ # 147A.

The primary virtual page # 141A is a number for identifying a primary virtual page in which the JNL is stored.

The status 142A indicates the status of the JNL. For example, the status 142A is as shown below.

(*) "Copied" indicates that the data included in the JNL is copied to the secondary DVOL 21B (i.e. that the JNL is reflected in the secondary DVOL 21B).
(*) "Copying" indicates that the JNL is transferred to the secondary storage apparatus 20B but that the JNL is not reflected in the secondary DVOL yet.
(*) "Readable" indicates that the JNL in the primary JVOL can be transferred to the secondary JVOL.
(*) "Not copied" indicates that the JNL in the primary JVOL is not transferred to the secondary JVOL yet.
(*) "Unassigned" indicates that no actual page is assigned to the primary virtual page.

The page starting address 143A is information indicating the starting address of the virtual page. The page ending address 144A is information indicating the ending address of each of the virtual pages.

The JNL starting address 145A is information indicating from which area of the virtual page the JNL is written. The JNL ending address 146A is information indicating to which area of the virtual page the JNL is written. By referring to the JNL starting address 145A and the JNL ending address 146A, the location of the JNL in the virtual page can be ascertained.

The SEQ # 147A indicates the SEQ # included in the JNL.

By referring to the primary JNL status management table 347A, the CPU 33A can determine the status of each of the JNLs.

FIG. 15 shows a configuration example of the secondary JNL status management table 347B.

The secondary JNL status management table 347B exists in each secondary JVOL. The secondary JNL status management table 347B stores each JNL in the secondary JVOL by associating a secondary virtual page # 141B, a status 142B, a page starting address 143B, a page ending address 144B, a JNL starting address 145B, a JNL ending address 146B, and an SEQ # 147B.

Since the secondary JNL status management table 347B is practically the same in the configuration as the primary JNL status management table 347A, the detailed explanation is omitted.

FIG. 16A shows a configuration example of the primary virtual page status management table 348A.

The primary virtual page status management table 348A exists in each primary JVOL 22A. The primary virtual page status management table 348A stores each primary virtual page by associating a primary virtual page # 161A and a status 162A.

The primary virtual page # 161A is a number for identifying a virtual page. The status 162A is information indicating the status of the virtual page. The status 162A is as shown below for example.

(*) "Copied" indicates that all the JNLs in the virtual page 221A are reflected in the secondary DVOL 21B.
(*) "Copying" indicates that at least one of the JNLs in the virtual page 221A is transferred to the secondary storage apparatus 20B and, at the same time, that at least one of the JNLs in the virtual page 221A is not reflected in the secondary DVOL 21B yet.
(*) "Readable" indicates that all the JNLs in the virtual page 221A can be transferred to the secondary JVOL 22B.

By referring to the primary virtual page status management table 348A, the CPU 33A can determine the status of each of the primary virtual pages 221A.

It should be noted that the status of the virtual page may depend on the statuses of the JNLs in the virtual page. For example, if the status of all the JNLs in a virtual page is "copied", the status of the virtual page may also be "copied". Meanwhile, for example, if the status of at least one of the JNLs in a virtual page is "copying", the status of the virtual page may also be "copying".

FIG. 16B shows a configuration example of the secondary virtual page status management table 348B.

The secondary virtual page status management table 348B exists in each secondary JVOL 22B. The secondary virtual page status management table 348B stores each secondary virtual page by associating a secondary virtual page # 161B and a status 162B. Since the secondary virtual page status management table 348B is practically the same in the configuration as the primary virtual page status management table 348A, the explanation is omitted.

FIG. 17A shows a configuration example of the primary pool management table 349A.

The primary pool management table 349A exists in each primary pool. The primary pool management table 349A stores each primary actual page by associating a Pool # 171A, an actual page # 172A, a virtual page # 173A, and a primary VVOL # 174A.

The Pool # 171A is a number for identifying a primary pool comprising the actual page. The actual page # 172A is a number for identifying the actual page. The virtual page # 173A is a number for identifying the virtual page to which the actual page is assigned. The primary VVOL # 174A is a number for identifying a primary VVOL including the virtual page to which the actual page is assigned. It should be noted that the virtual page # 173A and the primary VVOL # 174A corresponding to a free actual page may be a value indicating that the actual page is a free actual page (an actual page which can be assigned).

By referring to the primary pool management table 349A, the CPU 33A can determine which actual page is a free actual page (an actual page which can be assigned) and which actual page is assigned to which virtual page of which VVOL.

FIG. 17B shows the secondary pool management table 349B.

The secondary pool management table 349B exists in each secondary pool. The secondary pool management table 349B stores each secondary actual page by associating a secondary Pool # 171B, an actual page # 172B, a secondary virtual page # 173B, and a secondary VVOL # 174B. Since the secondary pool management table 349B is practically the same in the configuration as the primary pool management table 349A, the explanation is omitted.

Hereinafter, the processing performed in the present embodiment is explained.

Figure 18:
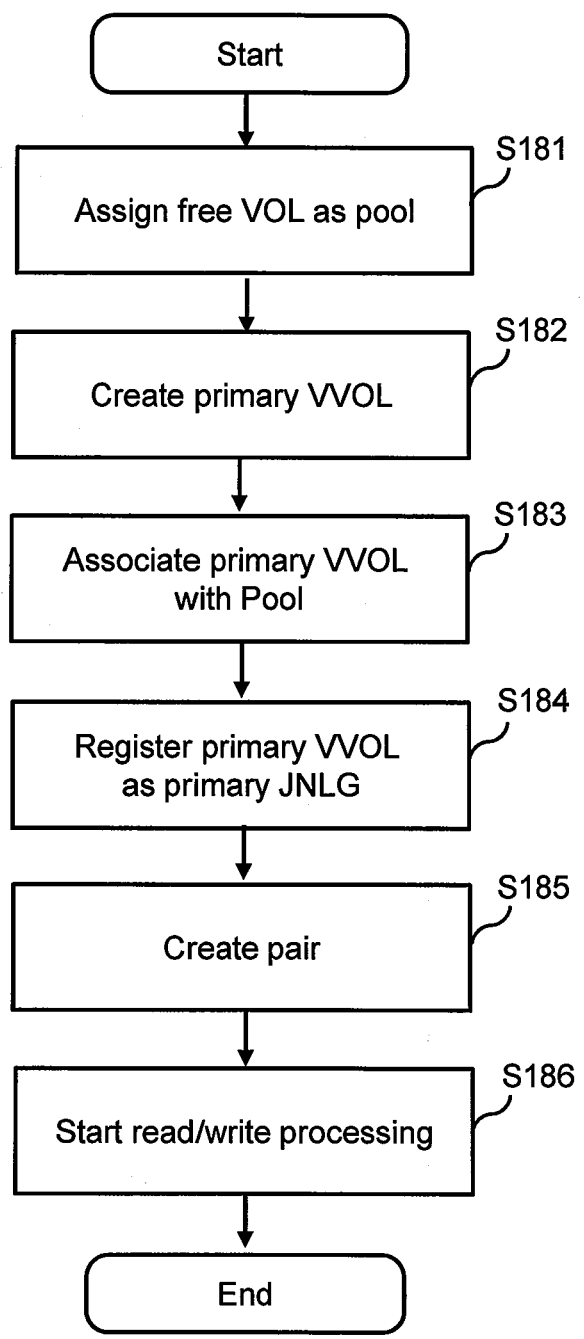
[FIG. 18]

FIG. 18 shows an example of the flow of the processing for creating a pair of JNLGs.

The controller 30A in the primary storage apparatus 20A refers to the primary VOL management table 341A in FIG. 8A and assigns a free VOL in the "unused" status to the primary pool 23A (S181). The controller 30A sets the status of the VOL assigned to the free pool to "in use".

The controller 30A creates a primary VVOL (S182). The primary VVOL is a primary DVOL 21A or a primary JVOL 22A.

The controller 30A associates the primary pool 23A with the primary VVOL (S183). This processing is performed by the controller 30A setting each of the VOL attributes 84A of the primary VOL management table 341A in FIG. 8A to "Data" or "JNL".

The controller 30A registers the primary VVOL as a primary JNLG (S184). This processing is performed by the controller 30A associating the VOL identified by the VOL # 92A of the primary JNLG management table 342A with any of the JNLGs identified by the primary JNLG 91A. By this processing, each of the VVOLs registered as VVOLs in the management table 311A in FIG. 8A is supposed to belong to any of the JNLGs.

The controller 30A creates a pair of JNLGs (S185). This processing is performed by the controller 30A associating the JNLG identified by the primary JNLG # 101 in the JNLG pair management table 343A with any of the JNLGs identified by the secondary JNLG # 102.

By this processing, a pair of a primary DVOL 21A and a secondary DVOL 21B and a pair of a primary JVOL 22A and a secondary JVOL 22B are created (refer to FIG. 11).

Subsequently, the controller 30A accepts an I/O command from the host 10, and performs the read or write processing for the primary DVOL in accordance with the I/O command (S186). Although the same pool is assigned to the primary DVOL 21A and the primary JVOL 22A at this step, different pools may also be assigned to both VOLs.

It should be noted that the controller 30B in the secondary storage apparatus 20B can also perform practically the same processing (the processing shown in FIG. 18) as the controller 30A.

Figure 19:
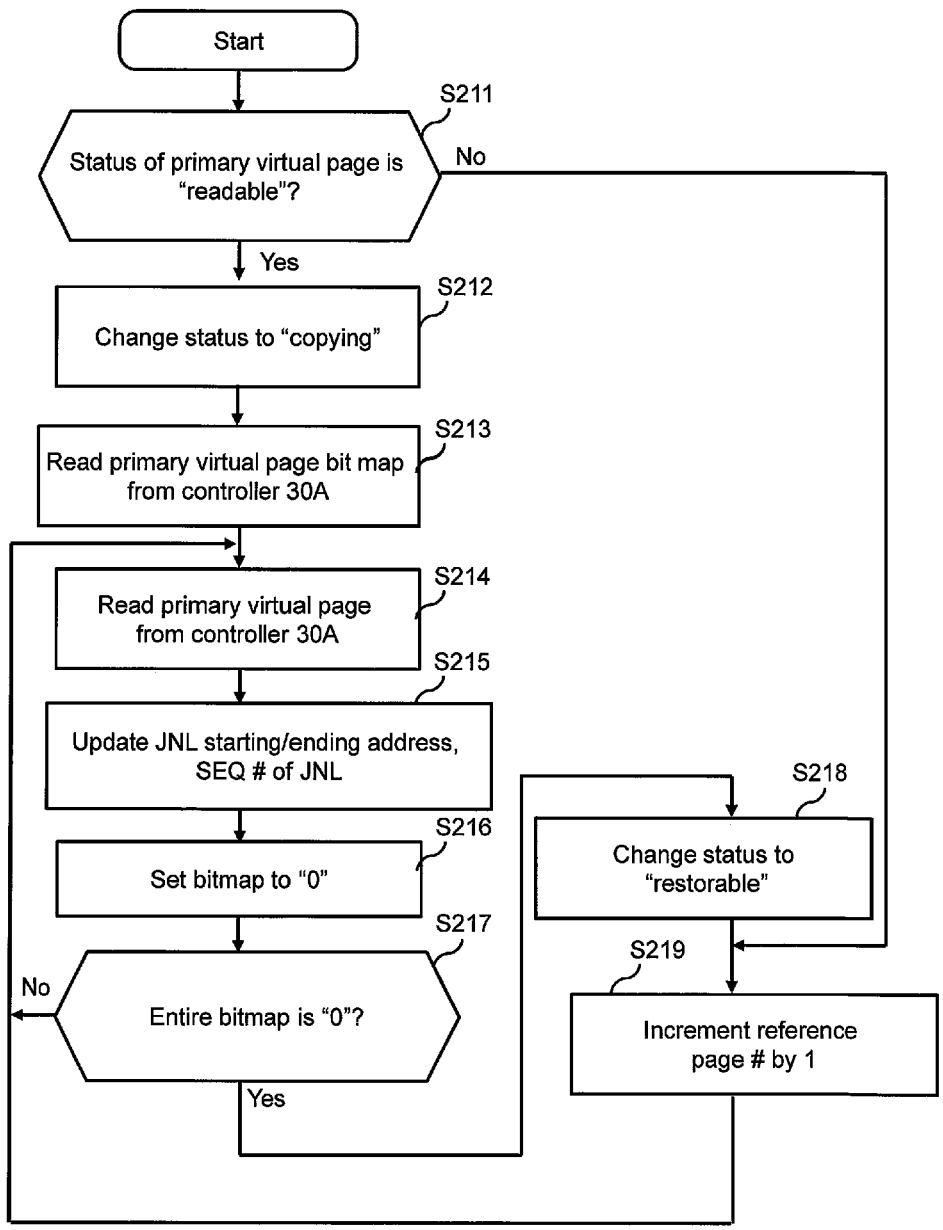
[FIG. 19]

FIG. 19 shows an example of the flow of the processing for copying a JNL from a primary JVOL 22A to a secondary JVOL 22B. The JNLs are transferred in units of JNLs in this processing.

The controller 30B refers to the primary JNL status management table 347A and checks whether a primary virtual page 221A which is set to "readable" exists or not, starting with the head page (in ascending order of primary virtual page # 141A) (S211).

If no primary virtual page which is set to "readable" exists (S211: No), the controller 30B checks the next primary virtual page 221A (S219).

If a primary virtual page 221A which is set to "readable" exists (S211: Yes), the controller 30B sets the status of the secondary virtual page 221B as the copy destination to "copying" (S212). By this processing, it becomes possible to copy the JNLs from the primary virtual page 221A to the secondary virtual page 221B which is set to the status "copying".

The controller 30B acquires the information indicating the primary virtual page bitmap (refer to FIG. 7A) of the primary virtual page as the copy target from the primary storage apparatus 20A (S213).

Next, the controller 30B transmits a read command for reading a JNL which is in the primary virtual page 221A in the status "readable" checked at S211 and whose bit is "1" (ON) to the controller 30A (S214).

The controller 30B updates the JNL starting address 145B, the JNL ending address 146B, and the SEQ # 147B of each of the JNLs in the secondary virtual page status management table 347B (S215).

The controller 30B updates the bit in the primary virtual page bitmap 70A (refer to FIG. 7A) corresponding to the updated JNL to "0" (OFF) (S216). The JNL which is set to "0" indicates that the JNL is copied to the secondary JVOL 22B. The controller 30B performs this processing for all the JNLs in the virtual page 221A as the copy target.

The controller 30B refers to the information indicating the primary virtual page bitmap 70A and checks whether all the JNLs in the primary virtual page as the copy target are all set to "0" or not (S217). By this processing, the controller 30B can determine whether the primary virtual page is completely copied to the secondary JVOL.

If the entire primary virtual page bitmap 70A is set to "0" (S217: Yes), the controller 30B sets the status related to the secondary virtual page 221B as the copy destination to "restorable" (S218). This processing is performed by the controller 30B updating the status 142B of the secondary virtual page status management table 347B from "copying" to "restorable".

The controller 30B refers to the next primary virtual page 221A (S219). Subsequently, it is checked by the controller 30A at S221 whether the status of the next primary virtual page 221A is "readable" or not.

Meanwhile, if the entire primary virtual page bitmap 70A is not set to "0" (S217: No), the controller 30B performs the processing at S214 and subsequent steps until the entire primary virtual page bitmap becomes "0" (until all the JNLs are copied).

By the above-mentioned processing, the JNLs are copied from the primary JVOL 22A to the secondary JVOL 22B.

Figure 20:
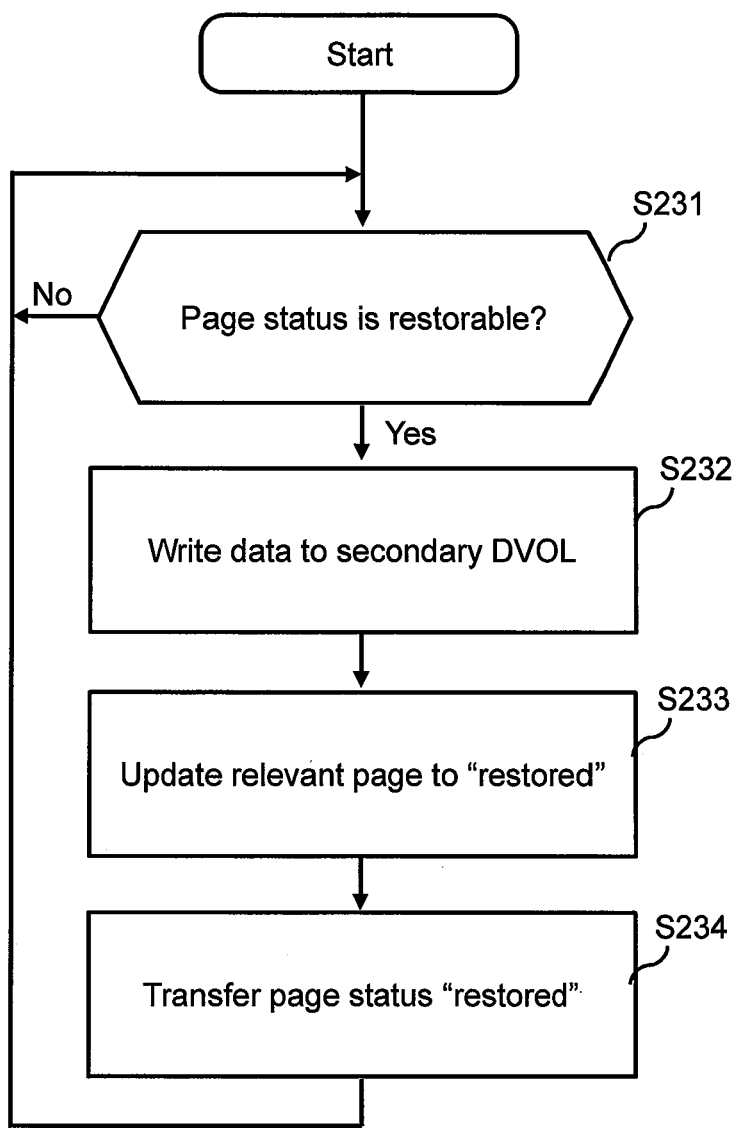
[FIG. 20]

FIG. 20 shows an example of the flow of the processing for restoring data to the secondary DVOL 21B.

The controller 30B refers to the secondary virtual page status management table 347B and checks whether the referred page is a secondary virtual page 221B in the status "restorable" or not (S231).

If the page is not a secondary virtual page in the status "restorable" (S231: No), the controller 30B checks whether the next secondary virtual page 221B is a "restorable" page or not (S231).

If [the page is] a "restorable" secondary virtual page 221B (S231: Yes), the controller 30B performs the processing for writing the data in the JNLs in this secondary virtual page 221B to the secondary DVOL 21B (S232). This processing may be performed in units of virtual pages and may also be performed in units of JNLs.

If all the JNLs in this secondary virtual page have been restored, the controller 30B sets the status of this secondary virtual page to "copied" (S233). This processing is performed by the controller 30B setting the status 142B of the secondary virtual page management table 347B to "copied".

The controller 30B transmits [a notification] that the status 142B of this secondary virtual page 221B is set to "copied" to the controller 30A in the primary storage apparatus (S234).

Figure 21:
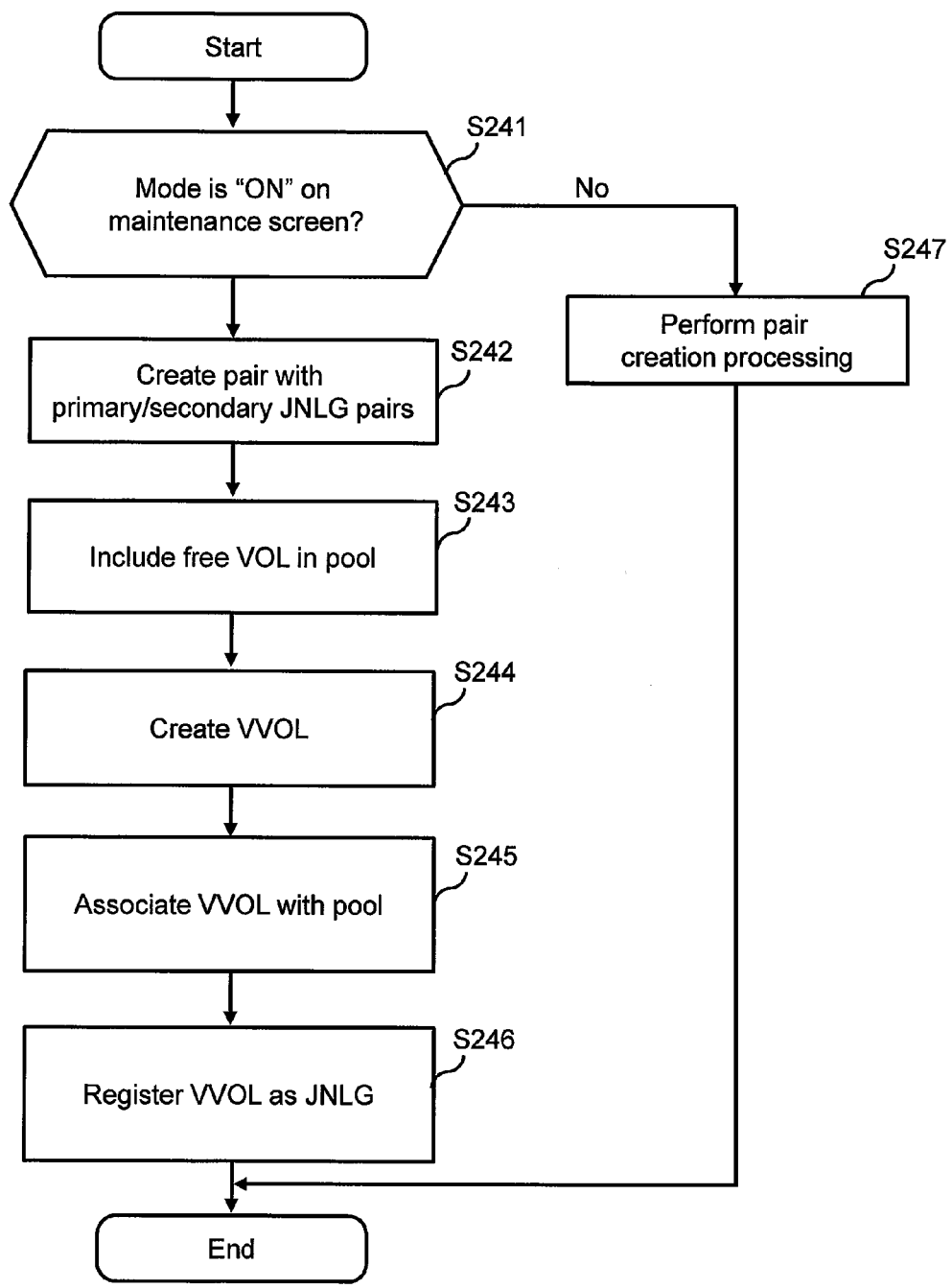
[FIG. 21]

FIG. 21 shows a flow of the processing for performing automatic definition of a JNLG.

The SVP 50 checks whether the mode which defines the JNLG is set to "ON" by the user or not on the maintenance screen (e.g. a GUI (Graphical User Interface) screen) displayed by the SVP 50 (S241).

If the mode is not set to "ON" (S241: No), a primary JNLG and a secondary JNLG are paired by the SVP 50 in accordance with the normal processing (S247).

If the mode is set to "ON" (S241: Yes), the SVP 50 receives, for example, the input of a URL (Uniform Resource Locator) from the user via the GUI screen, and creates a pair of a primary JNLG and a secondary JNLG (S242).

The controller 30A refers to the primary VOL management table 341A in accordance with the instruction from the SVP 50 and includes the VOL in the status "unused" in the primary pool (S243).

The controller 30A creates a primary VVOL in accordance with the instruction from the SVP 50 (S244).

The controller 30A associates the primary pool with the created primary VVOL (S245). This is performed by updating the primary VVOL management table 345A (the primary VVOL # 121A, the Pool # 122A, and the capacity 123A).

The controller 30A includes the primary VVOL in the primary JNLG (S246). This processing is performed by the controller 30A updating the primary JNLG management table 342A (the primary JNLG # 91A, the VOL # 92A, and the VOL attribute 93A).

The pair of the primary JNLG and the secondary JNLG is created by the above-mentioned processing, and consequently, a pool is assigned to the VVOL in the primary JNLG and the VVOL in the secondary JNLG, and the JNLGs are defined.

It should be noted that the controller 30B can perform practically the same processing (the processing shown in FIG. 21) as the controller 30A.

Figure 22:
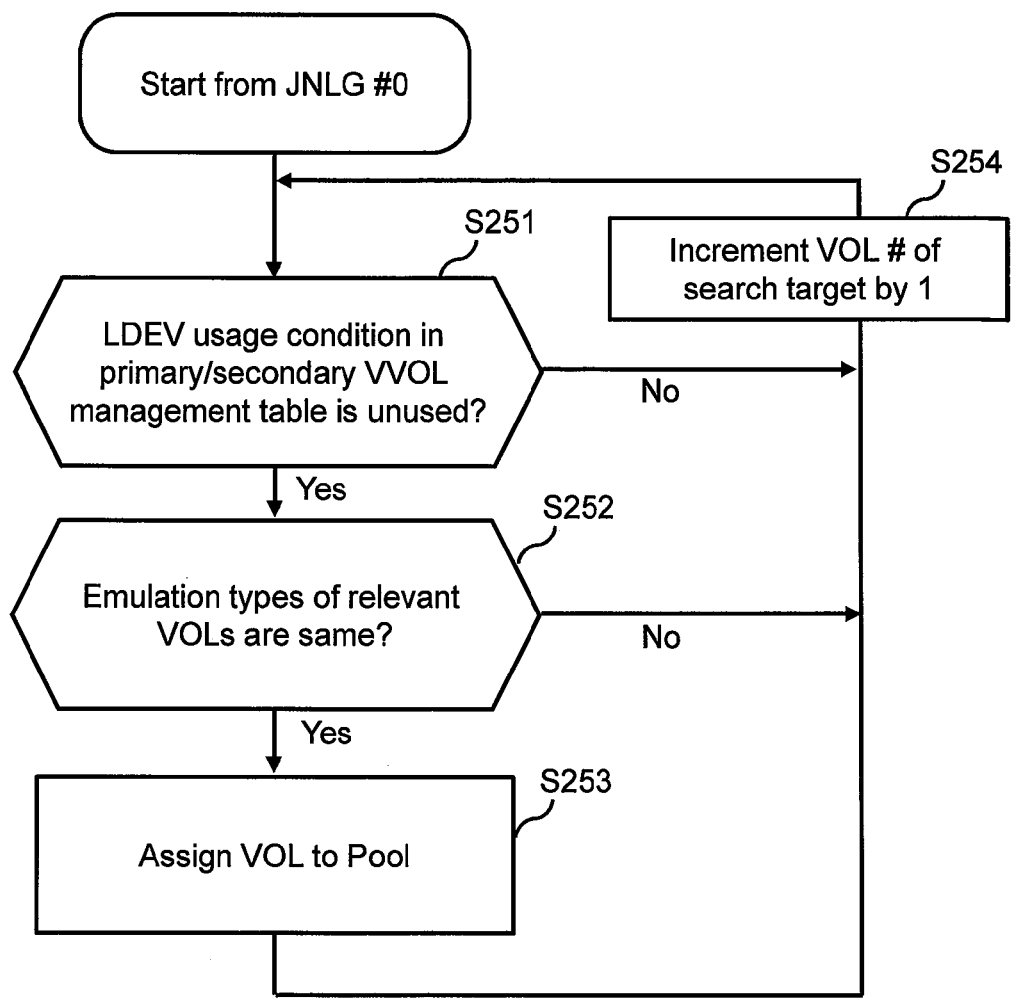
[FIG. 22]

FIG. 22 shows an example of the details of S243 in FIG. 21.

The controller 30A (30B) refers to the VOL management table 341A (341B) and checks whether the VOL is in the status "unused" or not (S251).

If the VOL is not in the status "unused" (S251: No), the controller 30A (30B) checks the next VOL (S254).

If the VOL is in the status "unused" (S251: Yes), the controller 30A (30B) checks the emulation type of the VOL (S252).

If this VOL is not the same in the emulation type as any of the VOLs configuring the pool (S252: No), the controller 30A (30B) checks the next VOL (S254).

If this VOL is the same in the emulation type as a VOL configuring the pool (S252: Yes), the controller 30A (30B) adds the VOL to the pool (S253).

Figure 23:
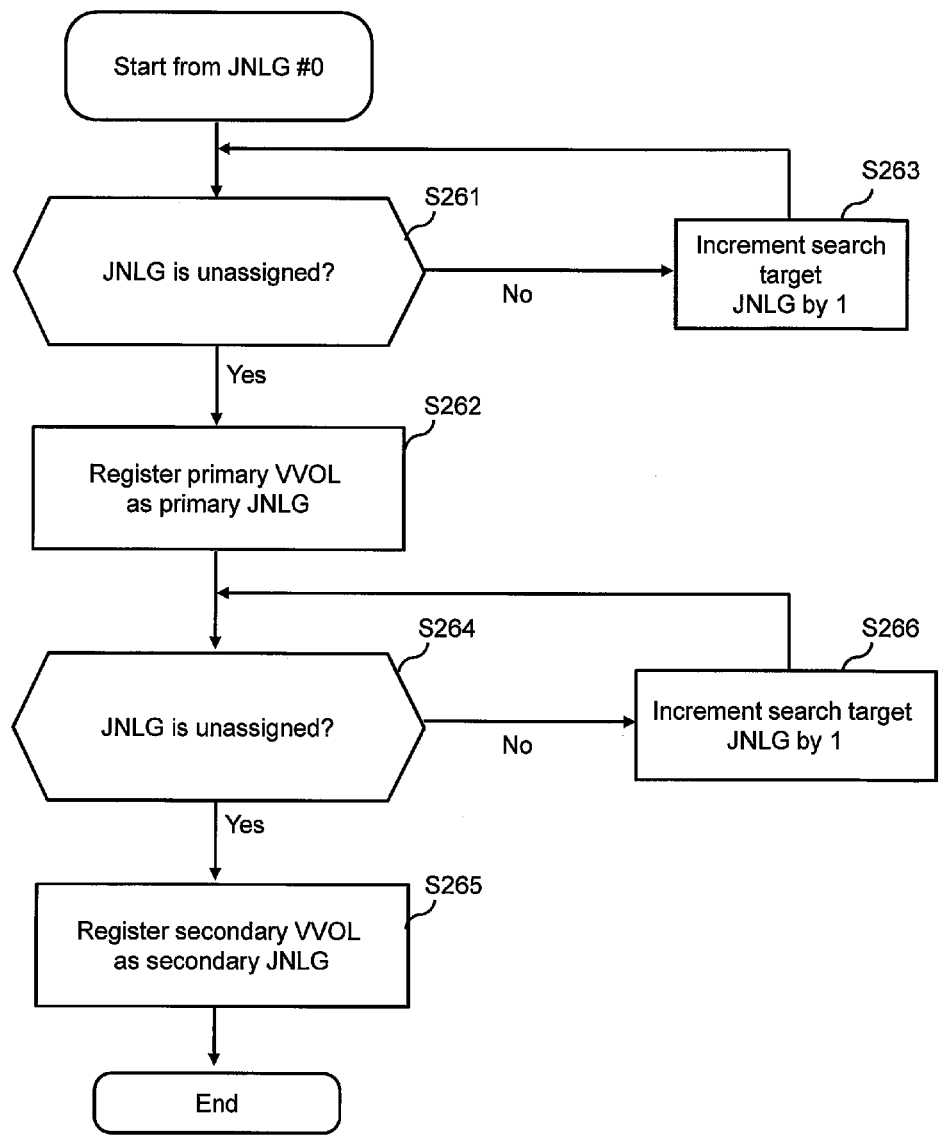
[FIG. 23]

FIG. 23 shows an example of the details of the processing at S246 in FIG. 21.

The controller 30A checks whether this primary JNLG is unassigned or not, starting with the JNLG #0 (S261). This processing is performed by the controller 30A checking whether the VOL # 92A is associated with the primary JNLG # 91A in the primary JNLG management table 342A or not.

If the primary JNLG is not unassigned (S261: No), the controller 30A checks whether the next primary JNLG (the JNGL # which can be acquired by adding 1 to the current JNLG #) is unassigned or not (S263).

If this primary JNLG is unassigned (S261: Yes), the controller 30A registers the primary VVOL in this primary JNLG (S262). This processing is performed by the controller 30A updating the primary JNLG management table 342A.

Next, the controller 30B checks whether this secondary JNLG is unassigned or not, starting with the JNLG #0 (S264). If this secondary JNLG is not unassigned (S264: No), the controller 30B checks whether the next secondary JNLG is unassigned or not (S266). This processing is performed by the controller 30B checking whether the VOL # 92AB is associated with the primary JNLG # 91B in the primary JNLG management table 342B or not.

If the secondary JNLG is unassigned (S264: Yes), the controller 30B registers the secondary VVOL in this secondary JNLG (S265). This processing is performed by the controller 30B updating the secondary JNLG management table 324B.

By the above-mentioned processing, the VVOL (DVOL, JVOL) to which the actual page is assigned from the pool is supposed to belong to any of the JNLGs.

Figure 24:
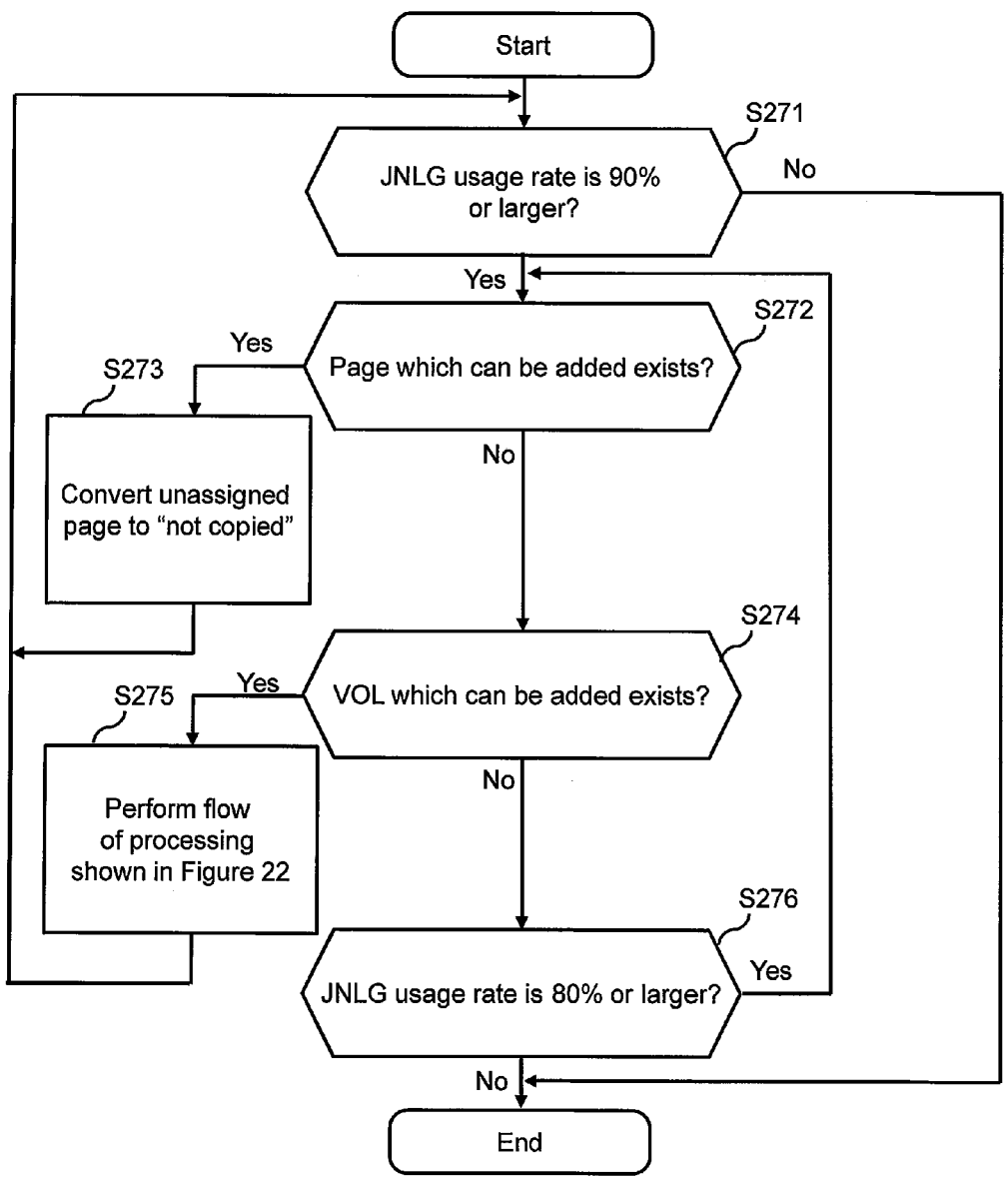
[FIG. 24]

FIG. 24 shows a flow of the processing in case where the usage rate of the JVOL exceeds a threshold.

Since this processing is practically the same in the primary storage apparatus 20A and in the secondary storage apparatus 20B, only the processing of the primary storage apparatus 20A is explained. Furthermore, the JNLG usage rates in the explanation below are a first threshold and a second threshold which is larger than the first threshold, and the first threshold is 90% and the second threshold is 80%, but these [thresholds] are not limited to this example. Furthermore, it may also be permitted that only one threshold exists instead of separate thresholds such as the first threshold and the second threshold.

The controller 30A checks whether the JNLG usage rate is 80% or larger or not (S271).

If the JNLG usage rate is less than 80% (S271: No), the controller 30A terminates the processing.

Meanwhile, if the JNLG usage rate is 80% or larger (S271: Yes), the controller 30A checks whether an actual page which can be newly assigned (an actual page which can be added) to a VVOL in the JNLG exists or not (S272). This processing is performed by the controller 30A referring to the primary JNL status management table 347A and checking an actual page whose status 142A is "unassigned" exists or not.

If an actual page which can be added exists (S272: Yes), the controller 30A assigns the actual page to the JNLG, and updates the status 142A of the virtual page which is the assignment destination of the actual page to "not copied" (S272).

If no actual page which can be added exists (S272: No), the controller 30A checks whether a VOL which can be added exists or not (S274). If a VOL which can be added exists (S274: Yes), the controller 30A adds the VOL to the JNLG by the processing in FIG. 22 (S275).

If no VOL which can be added exists (S274: No), the controller 30A checks whether the JNLG usage rate is 90% or larger or not (S276).

If the JNLG usage rate is not 90% or larger (S276: No), the controller 30A terminates the processing.

If the JNLG usage rate is 90% or larger (S276: Yes), the controller 30A performs S272 again. It should be noted that the controller 30A may also perform the error processing (e.g. the processing for notifying the error to the SVP 50) and terminate [the processing] instead of performing S272 again.

Figure 25:
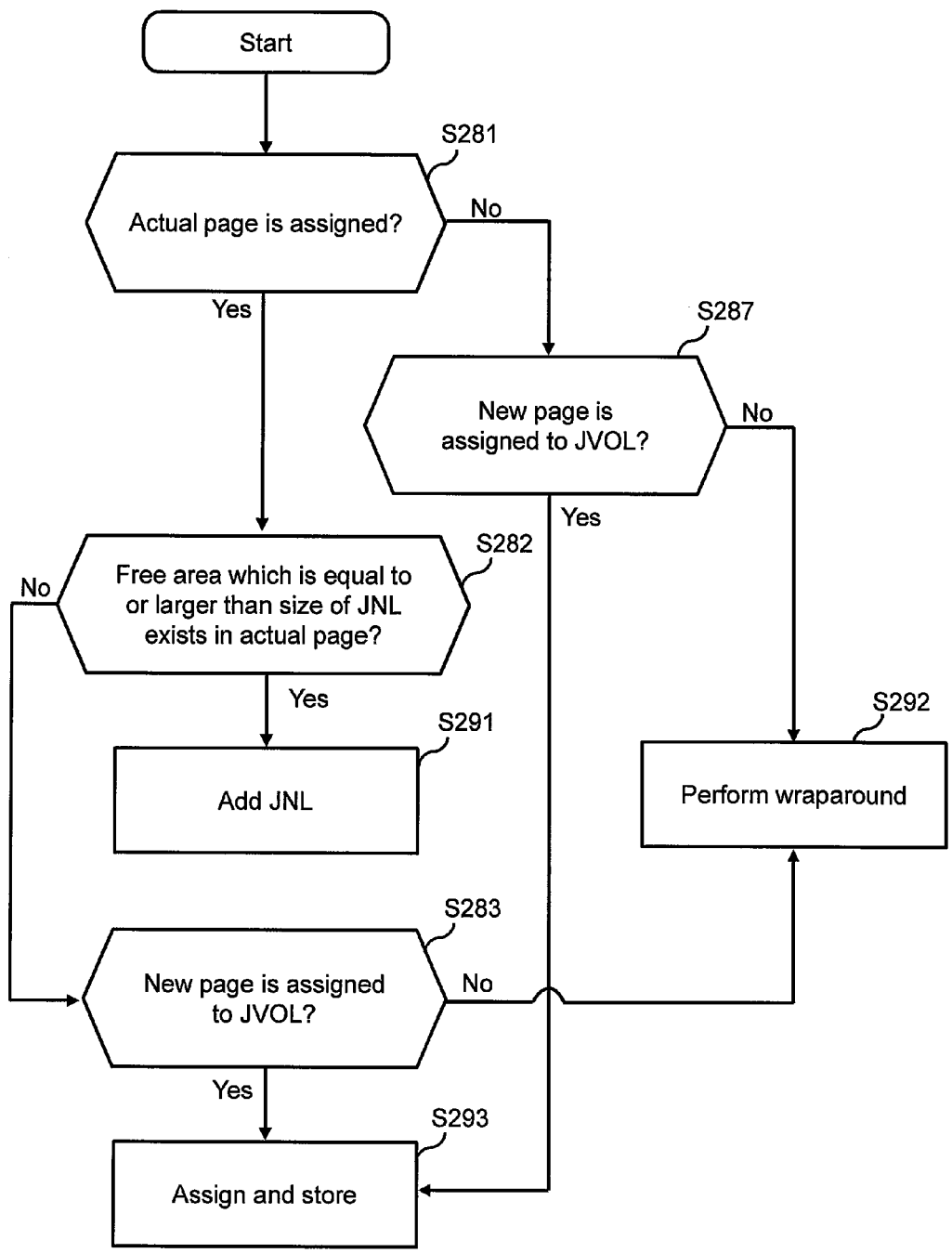
[FIG. 25]

FIG. 25 shows an example of the flow of the processing for writing JNLs to the primary JVOL 22A.

Since the flow of the processing for writing JNLs to the secondary JVOL 22B is practically the same as the flow of the processing for writing JNLs to the primary JVOL 22A, the explanation is omitted.

The controller 30A checks whether an actual page is already assigned to the write destination virtual page of a JNL or not (S281).

If an actual page is already assigned (S281: Yes), the controller 30A checks whether a free area which is equal to or larger than the size of a JNL exists in the actual page or not (S282).

If a free area which is equal to or larger than the size of a JNL exists in the actual page (S282: Yes), the controller 30A adds a JNL to the actual page (S291).

If a free area which is equal to or larger than the size of the JNL in the actual page (S282: Yes), the controller 30A checks whether to newly assign an actual page to the JVOL or not (S283). The result of this check is any of the items below, for example.

(A) In case the maximum number of actual pages assigned to the JVOL is a fixed value.
 (a1) No is acquired at S283 if the specified number of actual pages are already assigned to the JVOL.
 (a2) Yes is acquired at S283 if the specified number of actual pages are not assigned to the JVOL yet.
(B) In case where the maximum number of actual pages assigned to the JVOL is a variable value (however, the maximum number is smaller than the number of virtual pages configuring the JVOL).
 (b1) No is acquired at S283 if the number of virtual pages (or JNLs) whose status is set to "copied" reaches a specified number (e.g. 1).
 (b2) Yes is acquired at S283 if the number of virtual pages (or JNLs) whose status is set to "copied" does not reach a specified number (e.g. 1).

In case of the above-mentioned (B), the total number (the maximum number) of actual pages assigned to the JVOL varies depending on at what point of time the number of virtual pages (or JNLs) whose status is set to "copied" reaches the specified number (e.g. 1).

In case of Yes at S283, the controller 30A assigns the actual pages to the write destination virtual page and writes the JNLs to the assigned actual pages (S293).

Incase of No at S283, the controller 30A performs wrap-around, that is, overwrites the area of the oldest copied JNL in the one or more actual pages assigned to the JVOL by a new JNL (S292).

Meanwhile, if no actual page is assigned (S281: No), the controller 30A performs the same type of check as S283 (S287).

In case of Yes at S287, the controller 30A performs S293.

In case of No at S283, the controller 30A performs S292.

Figure 26:
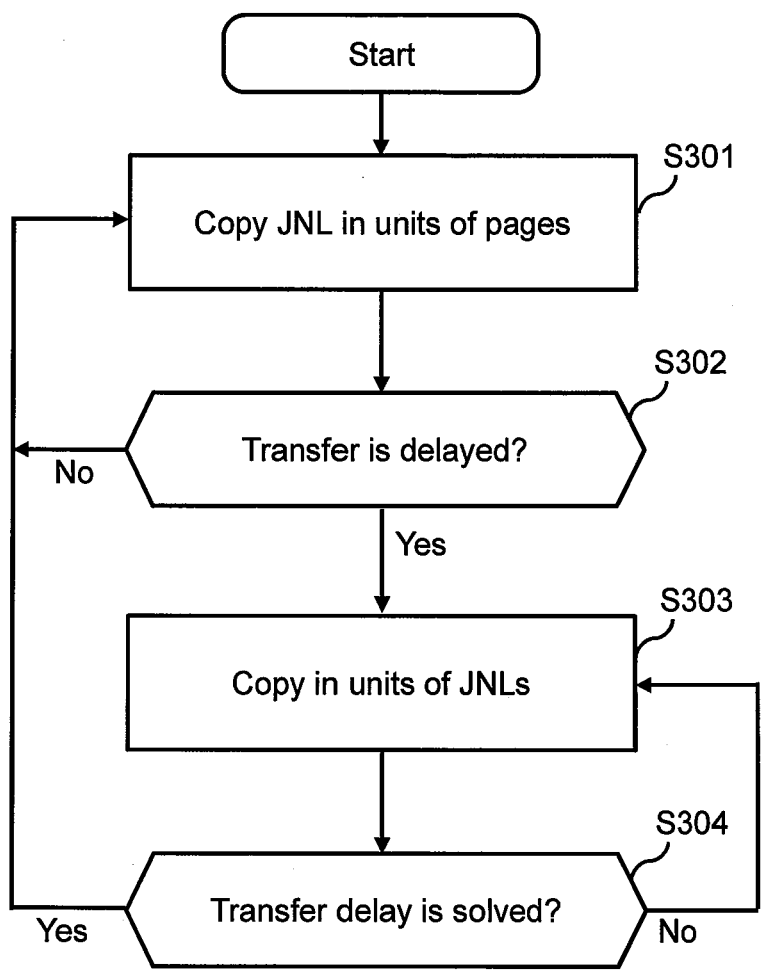
[FIG. 26]

FIG. 26 shows a flow of the processing related to switching the unit of transferring JNLs.

The controller 30B (30A) basically transfers JNL in units of virtual pages (S301). If all the JNLs in the primary virtual page 221A are copied to the secondary DVOL 21B, the controller 30B (30A) updates the status of the virtual page to "copied". Furthermore, each time a JNL in the primary virtual page 221A is copied to the secondary DVOL 21B, the controller 30A (30B) may update the status of the JNL to "copied". Furthermore, in the mode (period) in which the JNLs are transferred in units of virtual pages, the controller 30A (30B) may not have to update the status of each of the JNLs.

The controller 30B (30A) checks regularly or irregularly whether the communication load reaches a specified value or not, for example, whether the JNL transfer in units of virtual pages 221A is delayed or not (S302). At this point, that "the transfer is delayed" indicates that, for example, a specified number or more of virtual pages (or JNLs) whose status is "copying" exist in the storage apparatus 20A (20B).

If the communication load is smaller than the specified value (S302: No), the controller 30B (30A) continues the mode of transferring JNLs in units of virtual pages (S301).

Meanwhile, if the communication load is equal to or larger than the specified value (S302: Yes), the controller 30B (30A) switches the mode from transferring JNLs in units of virtual pages to transferring JNLs in units of JNLs (S303). For example, the controller 30B may transmit a read command for reading JNLs in units of virtual pages in the controller 30B to the primary storage apparatus 20A, and may transmit a read command for reading JNLs in units of JNLs in the mode of transferring JNLs in units of JNLs to the primary storage apparatus 20A. The controller 30A may transmit the JNLs in units of virtual pages to the secondary storage apparatus 20B, and may transmit the JNLs in units of JNLs to the secondary storage apparatus 20A in the mode of transferring the JNLs in units of JNLs.

It should be noted that the controller 30B (30A) may also update the status of each of the JNLs since such switching is performed. Furthermore, if the transfer mode is switched to the mode of transferring JNLs in units of JNLs, the controller 30B (30A) may also terminate the update of the status of each of the virtual pages.

The controller 30B (30A) checks regularly or irregularly whether the communication load being equal to or larger than the specified value is solved or not, for example, whether the delay in transfer is solved or not (S304). Specifically speaking, for example, the controller 30B (30A) checks whether the virtual pages (or the JNLs) whose status is "copying" are fewer than a specified number or not.

If the communication load being equal to or larger than the specified value is not solved (S304: No), the JNL transfer in units of JNLs is continued between the controllers 30B (30A) (S303).

If the communication load being equal to or larger than the specified value is solved (S304: Yes), the controller 30B (30A) switches the transfer mode from the mode of transferring JNLs in units of JNLs to the mode of transferring JNLs in units of virtual pages (S301).

If the communication load is equal to or larger than the specified value, the status "copied" can be expected to be acquired sooner for the virtual page or the JNL by switching the transfer mode as explained above. Therefore, the new assignment of actual pages to the JVOL can be stopped sooner, and eventually the consumption of actual pages can be expected to be inhibited.

Although an embodiment of the present invention is explained as above, the present invention is not limited to the above.

For example, the DVOL 21 may also be an actual VOL which is a VOL based on a RAID group instead of a VVOL, and may also be a virtual VOL (a virtual VOL complying with the storage virtualization technology) based on an external storage apparatus.

For example, for at least one of the virtual page or the JNL, the first copied [status] and the second copied [status] may also exist as the status "copied". The first copied is the status in case a JNL is stored in the secondary JVOL, and the second copied is the status in case the JNL is reflected in the secondary DVOL. If the new assignment of actual pages to the JVOL is stopped when a specified number of "first copied" virtual pages or JNLs are acquired, the consumption of actual pages can be expected to be further inhibited. Meanwhile, if the new assignment of actual pages to the JVOL is stopped when a specified number of "second copied" virtual pages or JNLs are acquired, the consumption of actual pages can be expected to be inhibited while retaining the JNLs as the guarantee for a longer period.

[Reference Sign List]

10: Host computer, 20A: Primary storage apparatus, 20B: Secondary storage apparatus

The invention claimed is:

1. A storage system comprising:
   a primary storage apparatus including:
   a primary virtual volume;
   a primary journal volume;
   a pool which includes a plurality of storage devices which are divided into a plurality of storage areas; and
   a primary controller which is configured to allocate one of the storage areas to the primary virtual volume according to writing first data sent from a computer and allocate one of the storage areas to the primary journal volume according to writing a first journal including the first data and a first sequence number indicating an order of which data is written to the primary virtual volume, and
   a secondary storage apparatus including:
   a secondary virtual volume which is a remote copy pair of the primary virtual volume; and
   a secondary controller configured to read the first journal remotely from the first storage apparatus and write the first data in the first journal to the secondary virtual volume,
   wherein the primary controller overwrites the first journal stored in the allocated storage area with a second journal including a second data sent from the computer and a second sequence number after the first journal is written into the secondary virtual volume.

2. The storage system according to claim 1, wherein the first journal is overwritten with the second journal when the primary controller is unable to allocate another storage area to the primary journal volume.

3. The storage system according to claim 1, wherein the primary controller transfers journals to the secondary controller in storage area units, and in a case where a communication load with the second storage apparatus is equal to or larger than a prescribed load, the primary controller switches to transfer journals to the secondary controller in journal units.

4. The storage system according to claim 1, wherein the primary controller is configured to transfer one or more journals stored in the primary journal volume to the secondary controller to be written to the secondary virtual volume,
   set each of the one or more journals that have been transferred to the secondary controller to have a first status, and set each of the one or more journals that have been written to the secondary virtual volume to have a second status, and
   upon a number of the one or more journals having the second status exceeding a threshold, stop allocating storage areas to the primary journal volume.

5. The storage system according to claim 1, wherein the primary controller allocates the one of the storage areas in a case where the primary journal volume has a free area smaller than the first journal.

6. The storage system according to claim 1, wherein the threshold is 1.

7. The storage system according to claim 1, wherein the primary controller is configured to transfer one or more journals stored in the primary journal volume to the secondary controller to be written to the secondary virtual volume,
   set each of the one or more journals that have not been transferred to the secondary controller to have a first status, and set each of the one or more journals that have been written to the secondary virtual volume to have a second status, and
   upon a number of the one or more journals having the second status exceeding a threshold, stop allocating storage areas to the primary journal volume.

8. The storage system according to claim 1, wherein the primary controller is configured to allocate more than one of the storage areas to the primary journal volume,
   transfer one or more journals stored in one of the allocated storage areas of the primary journal volume to the secondary controller to be written to the secondary virtual volume,
   set each of the one or more journals stored in the one of the allocated storage areas of the primary journal volume that have not been transferred to the secondary controller to have a first status, and set each of the one or more journals stored in the one of the allocated storage areas of the primary journal volume that have been written to the secondary virtual volume to have a second status, and
   upon a number of the one or more journals having the second status exceeding a threshold, stop allocating storage areas to the primary journal volume.

9. The storage system according to claim 1, wherein
   the primary controller includes a cache memory, and the primary controller secures a cache area from the cache memory, and is configured to temporarily store data to be input/output to/from at least one of the primary virtual volume and the primary journal volume in the cache area, and
   the primary controller keeps the cache area secured.

10. The storage system according to claim 9, wherein the cache area is kept secured with respect to all allocated storage areas of at least one of the primary virtual volume and the primary journal volume.

11. The storage system according to claim 9, wherein a predetermined number of storage areas are allocated to the primary journal volume prior to writing the first data.

12. The storage system according to claim 9, wherein the cache area is secured prior to allocating one of the storage areas to at least one of the primary virtual volume and the primary journal volume.

13. The storage system according to claim 12, wherein the predetermined number of storage areas is 1.

14. A storage control method for a storage system having a primary storage apparatus including a primary virtual volume, a primary journal volume, and a pool which includes a plurality of storage devices which are divided into a plurality of storage areas, and secondary storage apparatus having a secondary virtual volume which is a remote copy pair of the primary virtual volume, the storage control method comprising:

allocating one of the storage areas to the primary virtual volume according to writing first data sent from a computer;

allocating one of the storage areas to the primary journal volume according to writing a first journal including the first data and a first sequence number indicating an order of which data is written to the primary virtual volume;

reading the first journal remotely from the first storage apparatus and writing the first data in the first journal to the secondary virtual volume; and overwriting the first journal stored in the allocated storage area with a second journal including second data sent from the computer and a second sequence number after the first journal is written into the secondary virtual volume.

15. The storage control method according to claim 14, wherein the first journal is overwritten with the second journal when another storage area is unable to be allocated to the primary journal volume.

16. The storage control method according to claim 14, wherein more than one storage areas are allocated to the primary journal volume, and the primary journal volume stores a plurality of journals, and further comprising:

transferring journals stored in the primary journal volume to the secondary storage apparatus in storage area units; and upon a communication load between the first storage apparatus and the second storage apparatus becoming equal to or larger than a prescribed load, transferring journals to the secondary storage apparatus in journal units.

17. A non-transitory computer readable medium encoded with executable instructions that, when executed, perform a storage control method for a storage system having a primary storage apparatus including a primary virtual volume, a primary journal volume, and a pool which includes a plurality of storage devices which are divided into a plurality of storage areas, and secondary storage apparatus having a secondary virtual volume which is a remote copy pair of the primary virtual volume, the storage control method comprising:

allocating one of the storage areas to the primary virtual volume according to writing first data sent from a computer;

allocating one of the storage areas to the primary journal volume according to writing a first journal including the first data and a first sequence number indicating an order of which data is written to the primary virtual volume;

reading the first journal remotely from the first storage apparatus and writing the first data in the first journal to the secondary virtual volume; and overwriting the first journal stored in the allocated storage area with a second journal including second data sent from the computer and a second sequence number after the first journal is written into the secondary virtual volume.

18. The non-transitory computer readable medium according to claim 17, wherein more than one storage areas are allocated to the primary journal volume, and the primary journal volume stores a plurality of journals, and the storage control method further comprising:

transferring journals stored in the primary journal volume to the secondary storage apparatus in storage area units; and upon a communication load between the first storage apparatus and the second storage apparatus becoming equal to or larger than a prescribed load, transferring journals to the secondary storage apparatus in journal units.

19. The non-transitory computer readable medium according to claim 17, wherein the first journal is overwritten with the second journal when another storage area is unable to be allocated to the primary journal volume.

\* \* \* \* \*